(12) United States Patent
Lee

(10) Patent No.: US 10,004,214 B2
(45) Date of Patent: Jun. 26, 2018

(54) SPINNING REEL WITH VARIABLE GEAR RATIO TRANSMISSION

(71) Applicant: Haibao Fishing Tackle Co., Ltd., Zhejiang (CN)

(72) Inventor: Wen-Hsiang Lee, Taichung (TW)

(73) Assignee: Haibao Fishing Tackle Co., Ltd., Zhejiang (CN)

( * ) Notice: Subject to any disclaimer, the term of this patent is extended or adjusted under 35 U.S.C. 154(b) by 442 days.

(21) Appl. No.: 14/880,688

(22) Filed: Oct. 12, 2015

(65) Prior Publication Data

US 2016/0106082 A1    Apr. 21, 2016

(30) Foreign Application Priority Data

Oct. 17, 2014  (CN) .......................... 2014 1 0550238
Jun. 5, 2015   (CN) .......................... 2015 1 0307407

(51) Int. Cl.
*A01K 89/01*    (2006.01)

(52) U.S. Cl.
CPC ...... *A01K 89/0105* (2013.01); *A01K 89/0114* (2013.01); *A01K 89/01081* (2015.05)

(58) Field of Classification Search
CPC .......... A01K 89/0105; A01K 89/01081; A01K 89/0114; A01K 89/0184; A01K 89/01902; F16H 1/16
See application file for complete search history.

(56) References Cited

U.S. PATENT DOCUMENTS

| | | | | |
|---|---|---|---|---|
| 3,348,788 A | * | 10/1967 | Vinokur | A01K 89/012 242/225 |
| 4,739,944 A | * | 4/1988 | Atwell | A01K 89/012 242/225 |
| 6,460,792 B1 | * | 10/2002 | Morimoto | A01K 89/0114 242/241 |
| 8,888,031 B2 | * | 11/2014 | Inoue | F16H 55/17 242/249 |
| 2002/0003182 A1 | * | 1/2002 | Takikura | A01K 89/0114 242/279 |
| 2003/0146322 A1 | * | 8/2003 | Kitajima | A01K 89/0114 242/249 |
| 2017/0208784 A1 | * | 7/2017 | Lee | A01K 89/01902 |

* cited by examiner

*Primary Examiner* — Emmanuel Monsayac Marcelo
(74) *Attorney, Agent, or Firm* — Trop Pruner & Hu, P.C.

(57) ABSTRACT

A spinning reel includes a variable gear ratio device provided between a handle and a line guiding rotor. The variable gear ratio device includes outer and inner worm wheels rotatably sleeved on a rotary shaft. The outer worm wheel has a ring of outer gear teeth meshing with a worm. The inner worm wheel is nested in the outer worm wheel and has a ring of inner gear teeth surrounded by the outer gear teeth and meshing with the worm. An adjusting unit enables rotation of the rotary shaft to be transmitted to the worm via a selected one of the outer and inner worm wheels and enables idle rotation of the other one of the outer and inner worm wheels relative to the rotary shaft.

16 Claims, 24 Drawing Sheets

SPINNING REEL WITH VARIABLE GEAR RATIO TRANSMISSION

CROSS-REFERENCE TO RELATED APPLICATION

This application claims priorities of Chinese Patent Application No. 201410550238.1, filed on Oct. 17, 2014, and Chinese Patent Application No. 201510307407.3, filed on Jun. 5, 2015.

FIELD

The disclosure relates to a spinning reel, more particularly to a spinning reel with variable gear ratio transmission.

BACKGROUND

U.S. Pat. No. 7,537,178 discloses a spinning reel that is for mounting on a fishing rod and that includes a handle assembly, a line guiding rotor, a rotation transmission mechanism that transmits rotation of the handle assembly to the rotor, a spool shaft that is movable back and forth in cooperation with the rotation of the handle assembly, and a spool mounted on the spool shaft and configured for winding of a fishing line by the rotation of the line guiding rotor. The rotation transmission mechanism includes a master gear shaft coupled to the handle assembly, a master gear arranged on the master gear shaft, and a pinion gear that meshes with the master gear. The rotation transmission mechanism employs a constant gear ratio design that may be inadequate for a variety of situations.

SUMMARY

An object of the disclosure is to provide a spinning reel with variable gear ratio transmission.

According to the disclosure, a spinning reel comprises:
a main reel body;
a handle rotatably disposed at the main reel body;
a rotary shaft extending along an axis and coupled to and driven by the handle to rotate about the axis;
a worm unit including a tubular worm shaft that extends along a center line and that is disposed at an angle with respect to the axis, and a worm that is provided on and co-rotatable with the worm shaft;
a reciprocating mechanism including a reciprocating shaft extending into the worm shaft, the reciprocating mechanism being coupled to and driven by the rotary shaft to result in back and forth movement of the reciprocating shaft with respect to the center line;
a line guiding rotor coupled to and driven by the worm shaft to rotate about the center line;
a spool connected to the reciprocating shaft for reciprocating movement with respect to the line guiding rotor; and
a variable gear ratio device including an outer worm wheel and an inner worm wheel rotatably sleeved on the rotary shaft, the outer worm wheel having a ring of outer gear teeth meshing with the worm, the inner worm wheel being nested in the outer worm wheel and having a ring of inner gear teeth meshing with the worm, the outer gear teeth surrounding the inner gear teeth, the outer gear teeth and the inner gear teeth being disposed on a common plane, the outer worm wheel having a first gear ratio with the worm, the inner worm wheel having a second gear ratio with the worm, the second gear ratio being smaller than the first gear ratio, the variable gear ratio device further including an adjusting unit for enabling rotation of the rotary shaft to be transmitted to the worm unit via a selected one of the outer worm wheel and the inner worm wheel and for enabling idle rotation of the other one of the outer worm wheel and the inner worm wheel relative to the rotary shaft.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
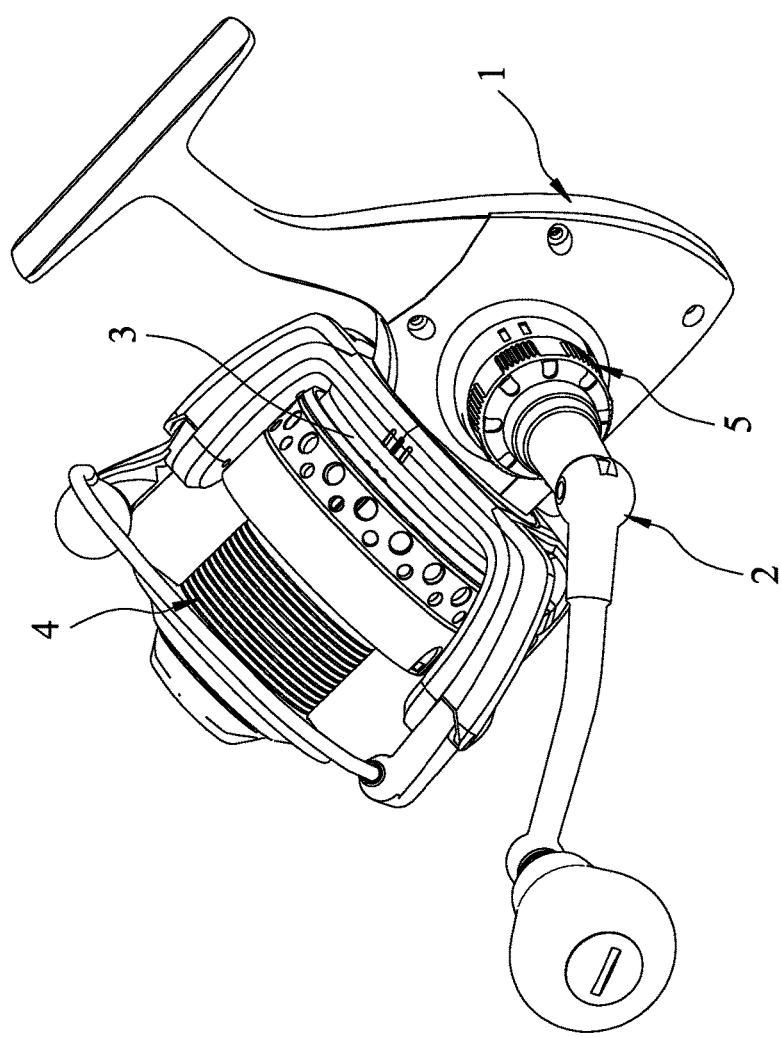
FIG. 1 is a perspective view illustrating a first embodiment of a spinning reel with variable gear ratio transmission according to the disclosure.

Before the disclosure is described in greater detail, it should be noted that like elements are denoted by the same reference numerals throughout the disclosure.

Figure 2:
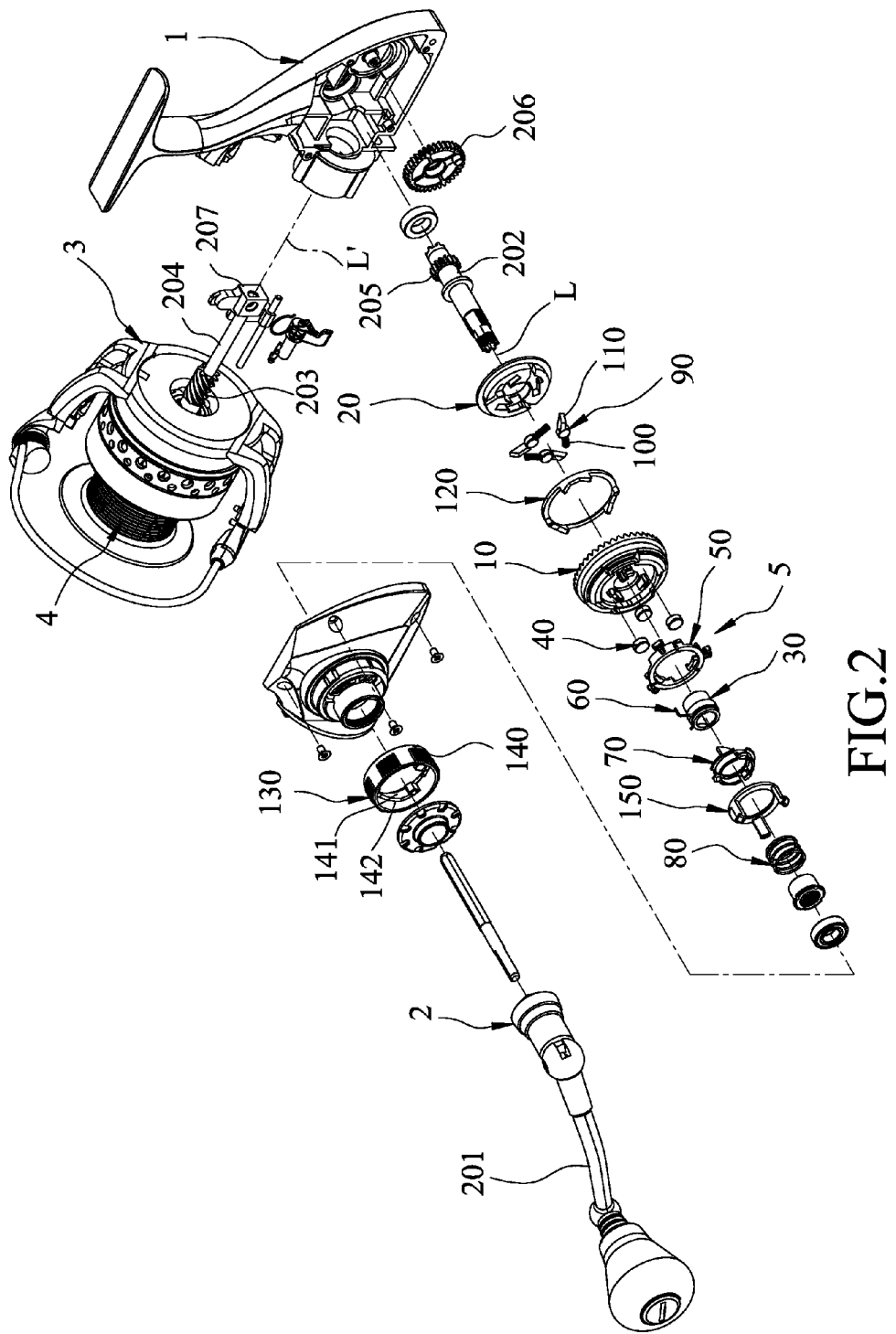
FIG. 2 is an exploded perspective view of the first embodiment.

Referring to FIGS. 1 and 2, the first embodiment of a spinning reel according to the disclosure is adapted for use with a fishing rod (not shown) and a fishing line (not shown) and includes a main reel body 1, and a drive unit 2, a line guiding rotor 3, a spool 4 and a variable gear ratio device 5 mounted on the main reel body 1.

Figure 3:
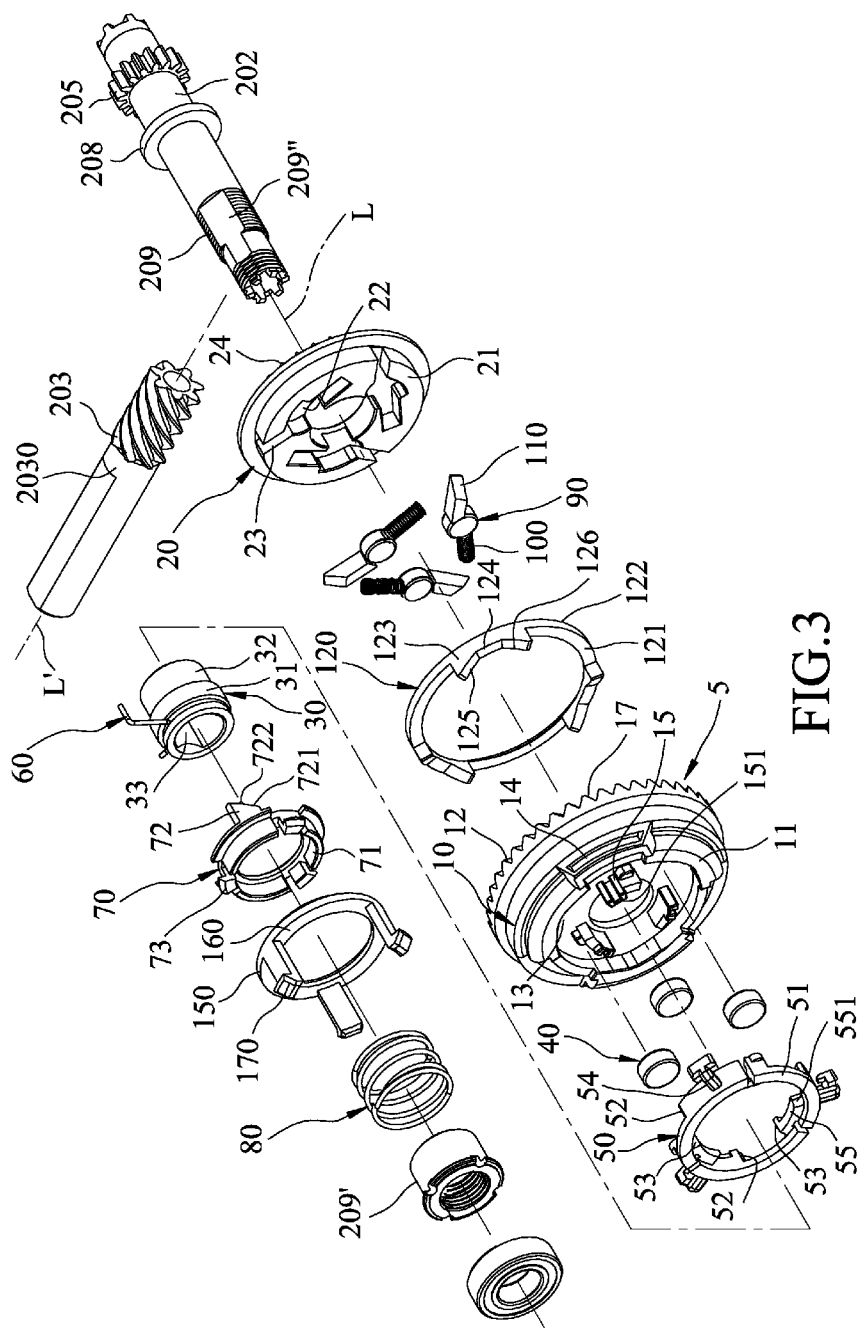
FIG. 3 is a fragmentary exploded perspective view of the first embodiment.
Figure 4:
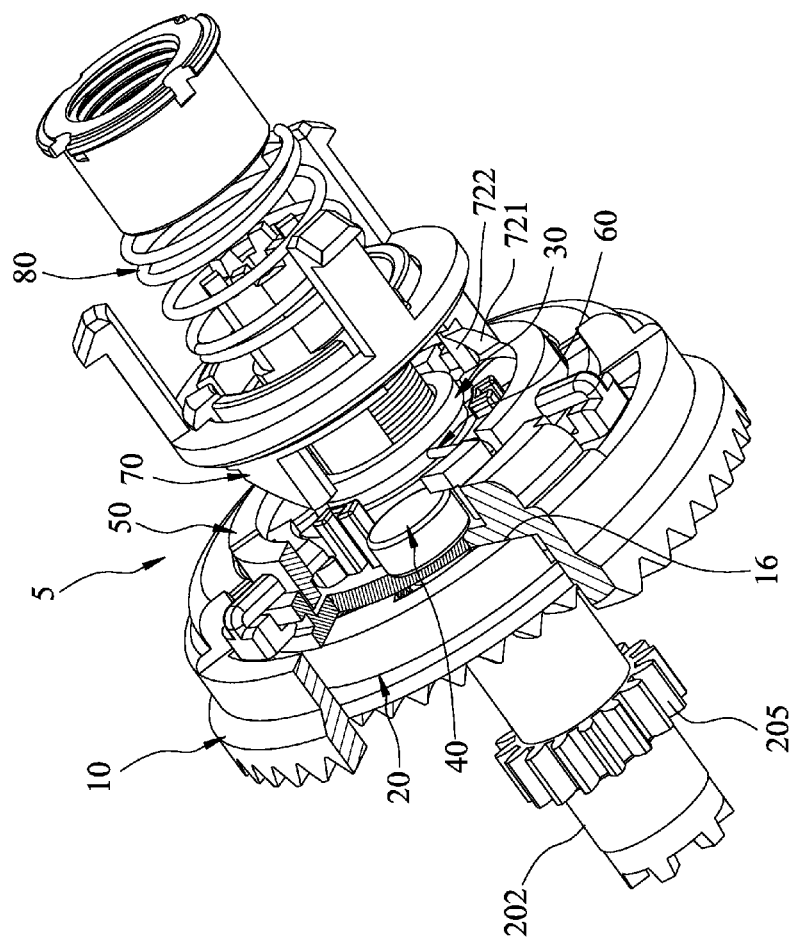
FIG. 4 is an assembled perspective partly cutaway view of the first embodiment.

The drive unit 2 includes: a handle 201 rotatably disposed at the main reel body 1; a rotary shaft 202 extending along an axis (L) and coupled to and driven to rotate by the handle 201 about the axis (L); a worm unit including a tubular worm shaft 2030 (see FIG. 3) that extends along a center line (L') and that is disposed at an angle with respect to the axis (L), and a worm 203 that is provided on and co-rotatable with the worm shaft 2030; and a reciprocating mechanism including a drive wheel 205 fixed on the rotary shaft 202, a follower wheel 206 disposed at the main reel body 1 and meshing with the drive wheel 205, a slider 207 driven by the follower wheel 206, and a reciprocating shaft 204 connected to the slider 207 and extending into the worm shaft 2030. The reciprocating mechanism is coupled to and driven by the rotary shaft 202 to result in back and forth movement of the reciprocating shaft 204 with respect to the center line (L'). Referring to FIG. 3, the rotary shaft 202 has a stop ring 208 disposed at one side of the drive wheel 205, a threaded portion 209 disposed at one side of the stop ring 208 opposite to the drive wheel 205, a fixing collar 209' threadedly secured to the threaded portion 209, and a pair of planar parts 209" formed at a location corresponding to the threaded portion 209. The cross-section of the rotary shaft 202 along a plane transverse to the axis (L) and at the location where the planar parts 209" are formed is non-circular.

The line guiding rotor 3 is installed at one side of the main reel body 1 and is coupled to and driven by the worm shaft 203 to rotate about the center line (L').

The spool 4 is connected to the reciprocating shaft 204 for reciprocating movement with respect to the line guiding rotor 3.

Referring to FIGS. 2, 3, 4 and 5, the variable gear ratio device 5 includes an outer worm wheel 10 and an inner worm wheel 20 rotatably sleeved on the rotary shaft 202, a drive collar 30 coupled to and co-rotatable with the rotary shaft 202, a plurality of first drive rollers 40 associated with the outer worm wheel 10, a drive member 50 disposed adjacent to the drive collar 30, a resilient coupling ring 60 connecting the drive collar 30 to the drive member 50, a clutch sleeve 70 disposed at one side of the drive member 50, a clutch spring 80 positioned on the rotary shaft 202 and biasing the clutch sleeve 70 toward the drive member 50, a plurality of second drive rollers 90 associated with the inner worm wheel 20, a plurality of biasing elements 100 for biasing the second drive rollers 90, a plurality of slide blocks 110 abutting against the second drive rollers 90, a control sleeve 120 disposed between the inner worm wheel 20 and the outer worm wheel 10, and an adjusting unit 130.

The drive collar 30 extends along the axis (L) through centers of the outer worm wheel 10 and the inner worm wheel 20, and abuts against and is positioned by the stop ring 208. The drive collar 30 has a first driving portion 31 corresponding to the outer worm wheel 10, a second driving portion 32 disposed at one side of the first driving portion 31 along the axis (L) and corresponding to the inner worm wheel 20, and a non-circular coupling hole 33 disposed along the axis (L). The coupling hole 33 is for coupling with the section of the rotary shaft 202 where the planar parts 209" are formed.

Figure 5:
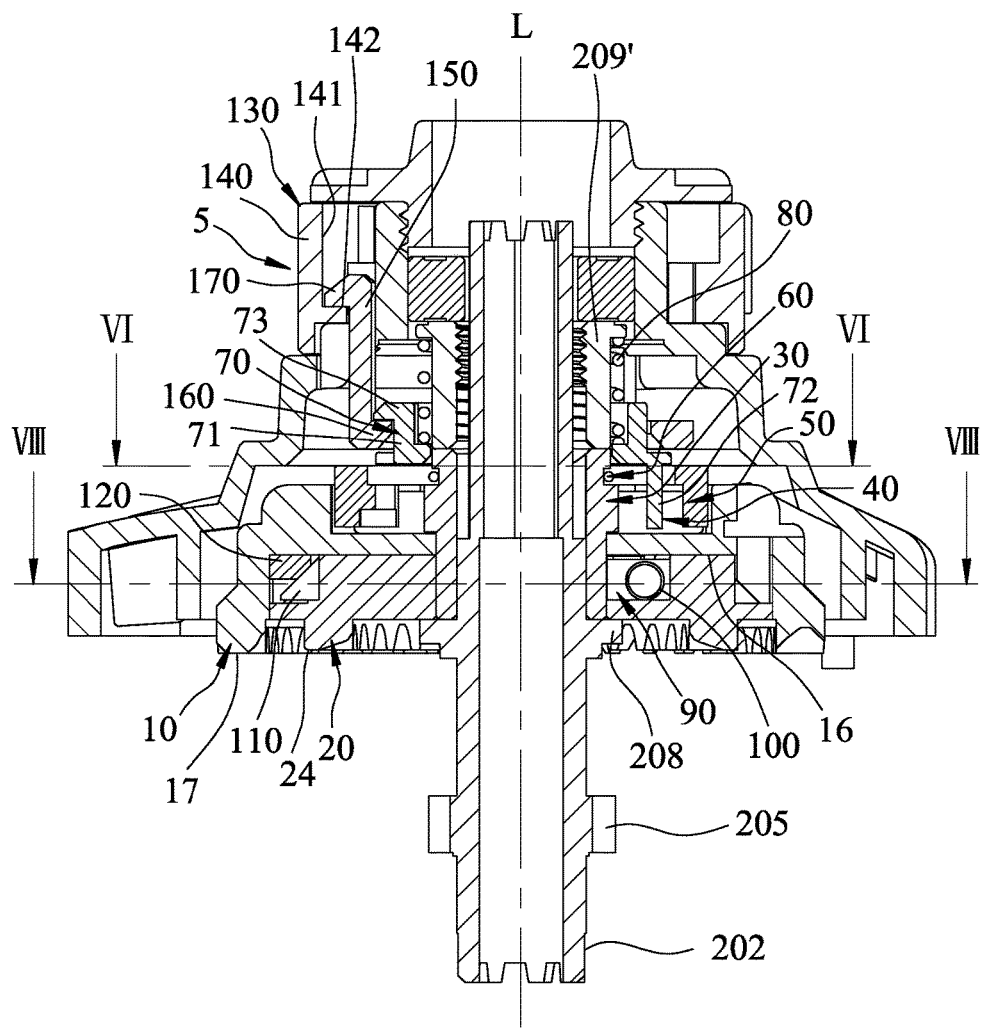
FIG. 5 is an assembled schematic sectional view of the first embodiment to illustrate a clutch sleeve moved toward an outer worm wheel, and an inner worm wheel being drivable for forward rotation transmission.
Figure 6:
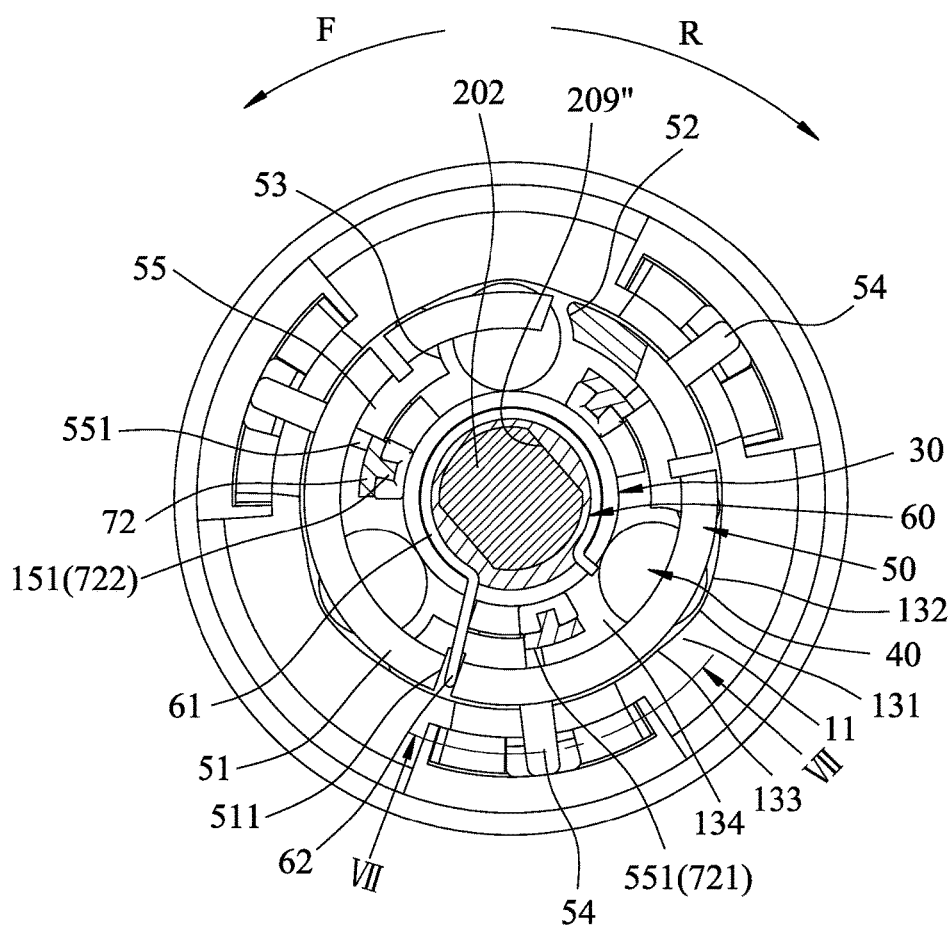
FIG. 6 is a sectional view taken along line VI-VI in FIG. 5, illustrating first drive rollers respectively disposed in intermediate sections of first drive slots.

The outer worm wheel 10 has a first end face 11 transverse to the axis (L), a back end face 12 opposite to the first end face 11, a plurality of first drive slots 13 indented from the first end face 11, spaced apart from each other and disposed to surround the axis (L), a plurality of through slots 14 extending from the first end face 11 through the back end face 12, a plurality of positioning blocks 15 each disposed at one side of a respective one of the first drive slots 13 and each extending parallel to the axis (L), a sink hole 16 indented from the back end face 12, and a ring of outer gear teeth 17 disposed at the back end face 12 for meshing with the worm shaft 203. Referring to FIG. 6, each first drive slot 13 has an intermediate section 131, a forward rotation first involute surface 132 that extends from the intermediate section 131 in a forward rotation direction (F) and in a gradually approaching manner with respect to the axis (L), and a reverse rotation second involute surface 133 that extends from the intermediate section 131 in a reverse rotation direction (R) opposite to the forward rotation direction (F) and in a gradually approaching manner with respect to the axis (L). Each first drive slot 13 cooperates with the first driving portion 31 of the drive collar 30 to form a corresponding first drive chamber 134. Each positioning block 15 has a positioning slot 151. The outer gear teeth 17 surround an outer part of the sinkhole 16, as best shown in FIG. 5.

Figure 8:
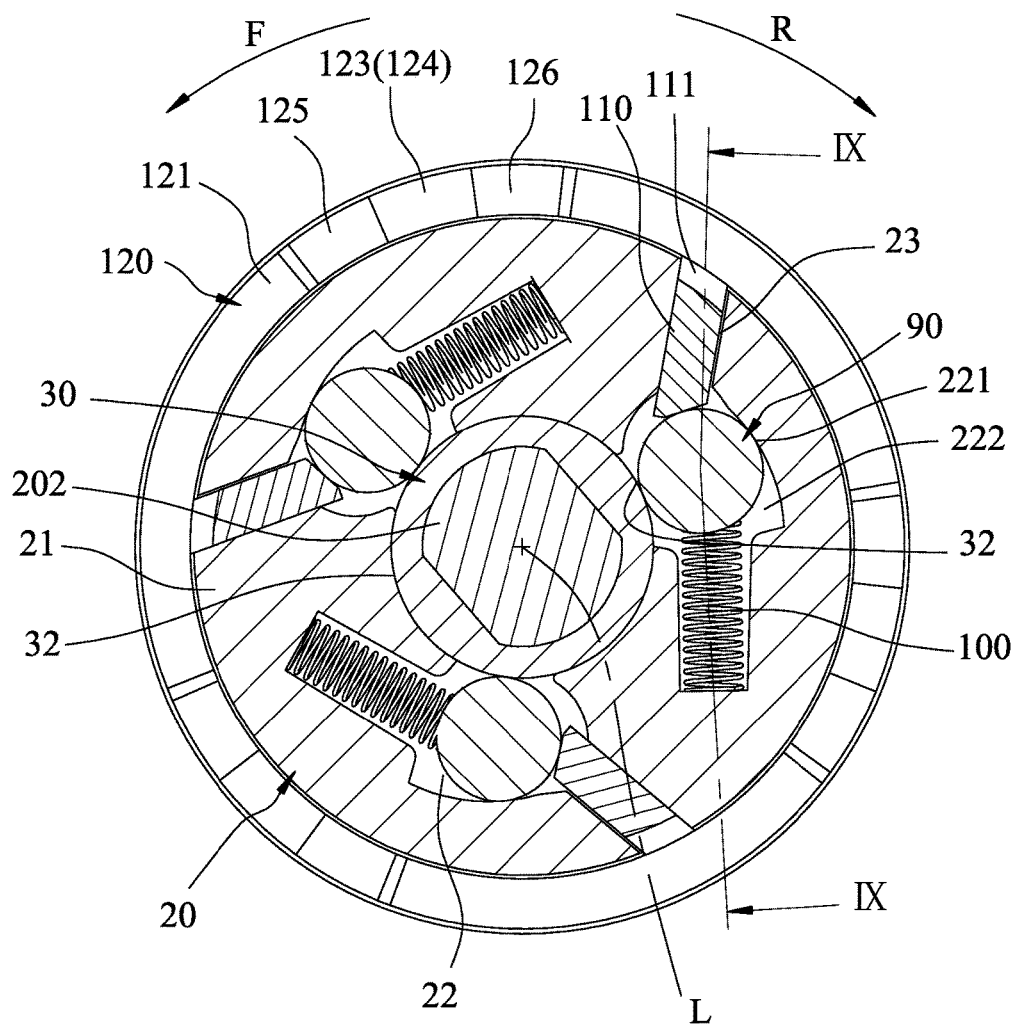
FIG. 8 is a sectional view taken along line VIII-VIII in FIG. 5, illustrating second drive rollers wedged between a drive collar and involute faces of second drive slots.

The inner worm wheel 20 is installed in the sinkhole 16 and is thus nested in the outer worm wheel 10. The inner worm wheel 20 abuts against and is positioned by the stop ring 208. With further reference to FIG. 8, the inner worm wheel 20 has a second end face 21, a plurality of second drive slots 22 indented from the second end face 21, a plurality of slide slots 23 extending outwardly and respectively from the second drive slots 22, and a ring of inner gear teeth 24 (see FIG. 5) disposed opposite to the second end face 21 and disposed to mesh with the worm 203. Each second drive slot 22 has an involute surface 221 that corresponds in position to a respective one of the forward rotation first involute surfaces 132 and that extends in the forward rotation direction (F) and in a gradually approaching manner with respect to the axis (L). Each second drive slot 22 cooperates with the second driving portion 32 of the drive collar 30 to forma corresponding second drive chamber 222. The outer gear teeth 17 surround the inner gear teeth 24, and the outer gear teeth 17 and the inner gear teeth 24 are disposed on a common plane, as best shown in FIG. 5. The outer worm wheel 10 has a first gear ratio with the worm 203, and the inner worm wheel 20 has a second gear ratio with the worm 203. The second gear ratio is smaller than the first gear ratio.

With further reference to FIG. 6, the first drive rollers 40 are respectively and movably installed in the first drive chambers 134, respectively.

Referring to FIGS. 3 to 6, the drive member 50 has a main ring portion 51, a plurality of forward rotation thrust surfaces 52 formed on the main ring portion 51 and each disposed adjacent to one side of a corresponding one of the first drive rollers 40, a plurality of reverse rotation thrust surfaces 53 formed on the main ring portion 51 and each disposed adjacent to an opposite side of a corresponding one of the first drive rollers 40, a plurality of positioning pieces 54 each connected to an outer ring surface of the main ring portion 51 and each extending parallel to the axis (L), and a plurality of extension plates 55 each projecting from an inner ring surface of the main ring portion 51. The main ring portion 51 is formed with a plurality of engaging grooves 511. Each extension plate 55 has one side formed with an inclined driven surface 551. Each reverse rotation thrust surface 53 is disposed at another side of a respective one of the extension plates 55 opposite to the inclined driven surface 551.

As best shown in FIG. 6, the resilient coupling ring 60 has a generally C-shaped ring part 61 that is sleeved on and fittingly engages the drive collar 30, and a hook part 62 that is connected to the ring part 61, that extends radially outward from the drive collar 30, and that engages the drive member 50 at one of the engaging grooves 511.

Referring once again to FIGS. 3 to 6, the clutch sleeve 70 has a tubular portion 71, a plurality of protruding blocks 72 connected to one side of the tubular portion 71, and a plurality of engaging hooks 73 connected to another side of the tubular portion 71 opposite to the protruding blocks 72. Each protruding block 72 has a distal end formed with an inclined driving face 721 that complements the inclined driven surface 551 of a respective one of the extension plates 55, and a rotation stopping piece 722 that is disposed at an inner side of the protruding block 72 and that is in sliding engagement with the positioning slot 151 of a corresponding one of the positioning blocks 15.

In this embodiment, the clutch spring 80 is a compression spring, is sleeved on the fixing collar 209', and has a spring section surrounded by the tubular portion 71 of the clutch sleeve 70. The clutch spring 80 provides a biasing force to bias the inclined driving faces 721 of the protruding blocks 72 to abut against the inclined driven surfaces 551 of the extension plates 55.

Referring to FIG. 8, the second drive rollers 90 are respectively and movably installed in the second drive chambers 222. In addition, each of the biasing elements 100 has one end extending into a respective one of the second drive chambers 222, and provides a biasing force for biasing the respective one of the second drive rollers 90 toward a respective one of the slide slots 23. Furthermore, each of the slide blocks 110 is slidably disposed in a respective one of the slide slots 23 and has an inclined outer face 111 distal from the respective one of the second drive rollers 90.

Figure 7:
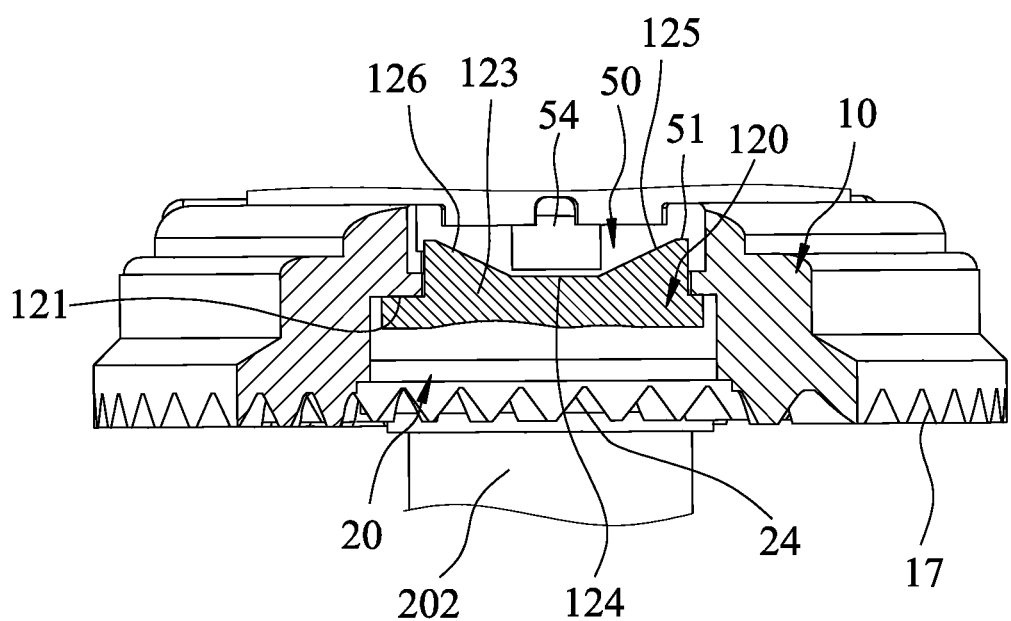
FIG. 7 is a schematic sectional view taken along line VII-VII in FIG. 6, illustrating a positioning piece of a drive member aligned with a level section of a guide seat of a control sleeve.
Figure 9:
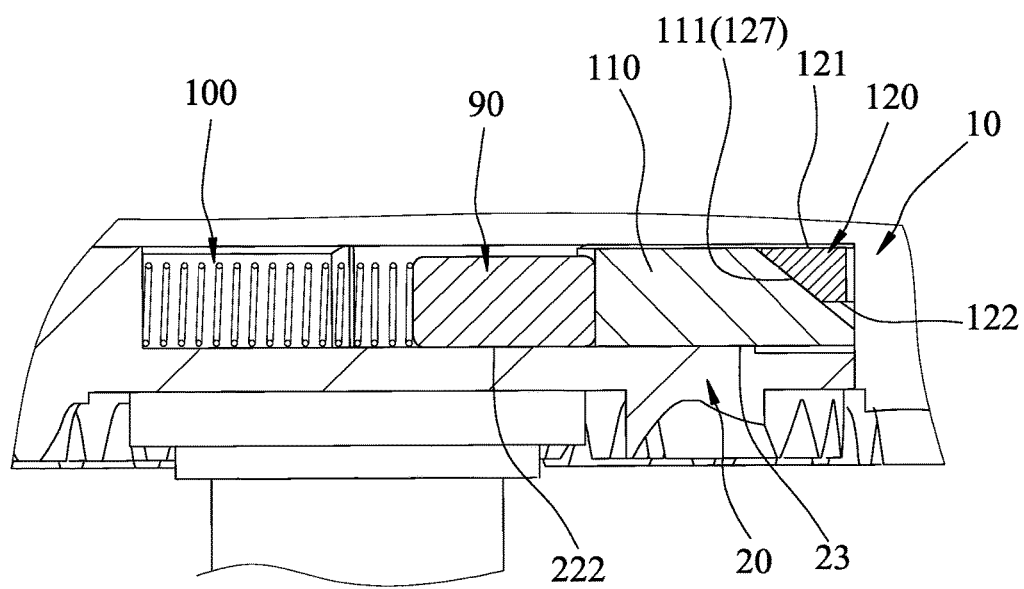
FIG. 9 is a sectional view taken along line IX-IX in FIG. 8, illustrating movement of the control sleeve and outward movement of a slide block.
Figure 10:
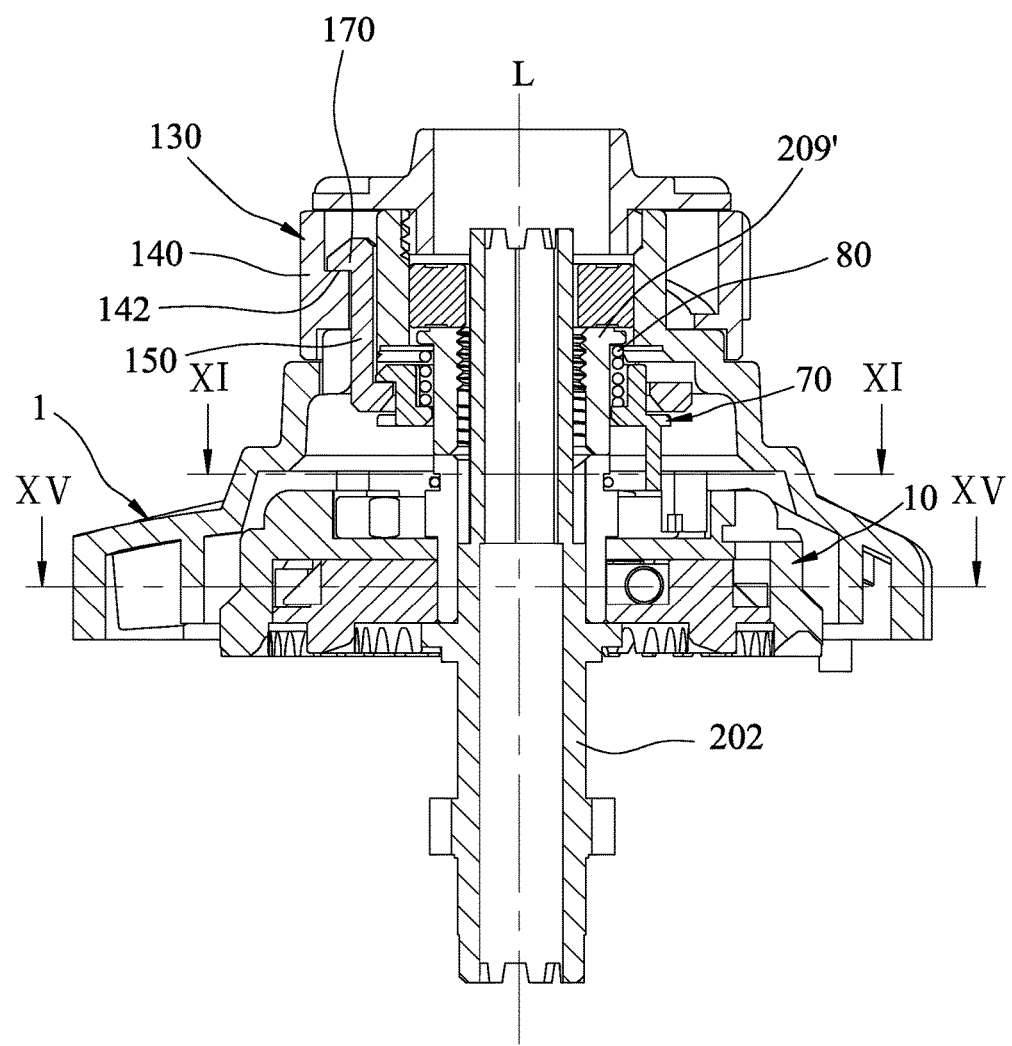
FIG. 10 is another assembled schematic sectional view of the first embodiment to illustrate the clutch sleeve moved away from the outer worm wheel, and the outer worm wheel being drivable for forward rotation transmission and reverse rotation transmission.

Referring to FIGS. 3, 7 and 8, the control sleeve 120 is an annular ring and has a first side face 121 facing toward the outer worm wheel 10, and a second side face 122 opposite to the first side face 121 along the axis (L) and facing toward the inner worm wheel 20. The first side face 121 is formed with a plurality of guide seats 123 that respectively correspond to the positioning pieces 54 and that respectively extend through the through slots 14 of the outer worm wheel 10. Each guide seat 123 has a level section 124, a forward rotation ramp surface 125 that extends circumferentially from one side of the level section 124, and a reverse rotation ramp surface 126 that extends circumferentially from another side of the level section 124 opposite to the forward rotation ramp surface 125. For each guide seat 123, the forward rotation ramp surface 125 and the reverse rotation ramp surface 126 incline in opposite directions. As best shown in FIG. 9, the control sleeve 120 further has a taper surface 127 that extends between the first side face 121 and the second side face 122, that gradually approaches the axis (L) in an extension direction from the second side face 122 toward the first side face 121, and that complements the inclined outer faces 111 of the slide blocks 110.

Referring to FIGS. 2 and 5, the adjusting unit 130 includes a gear ratio adjusting sleeve 140 disposed to surround the rotary shaft 202 and disposed between the handle 201 and the main reel body 1, and a coupling sleeve 150 driven by the gear ratio adjusting sleeve 140. The gear ratio adjusting sleeve 140 has an inner annular surface 141 that surrounds the axis (L), and a plurality of helical tracks 142 that are disposed at the inner annular surface 141 and that surround the axis (L). The coupling sleeve 150 has a ring portion 160 that engages the engaging hooks 73 to drive movement of the clutch sleeve 70, and a plurality of claw parts 170 that are connected to the ring portion 160 and that are guided by the helical tracks 142.

Referring to FIGS. 1 to 5, when the gear ratio adjusting sleeve 140 is operated to dispose the claw parts 170 of the coupling sleeve 150 at one end of the helical tracks 142 closest to the inner worm wheel 20, the clutch sleeve 70 is biased by the clutch spring 80 to approach the outer worm wheel 10. Referring to FIG. 6, the inclined driving faces 721 of the protruding blocks 72 press against the inclined driven surfaces 551 of the extension plates 55 to result in slight rotation of the drive member 50 relative to the drive collar 30 and the outer worm wheel 10. At this time, the forward rotation thrust surfaces 52 and the reverse rotation thrust surfaces 53 restrict circumferential movement of the first drive rollers 40, and cooperate to dispose the first drive rollers 40 in the intermediate sections 131 of the first drive slots 13. Accordingly, the first drive rollers 40 are disposed at an idling position, and the outer worm wheel 10 is able to rotate idly relative to the rotary shaft 202.

Figure 13:
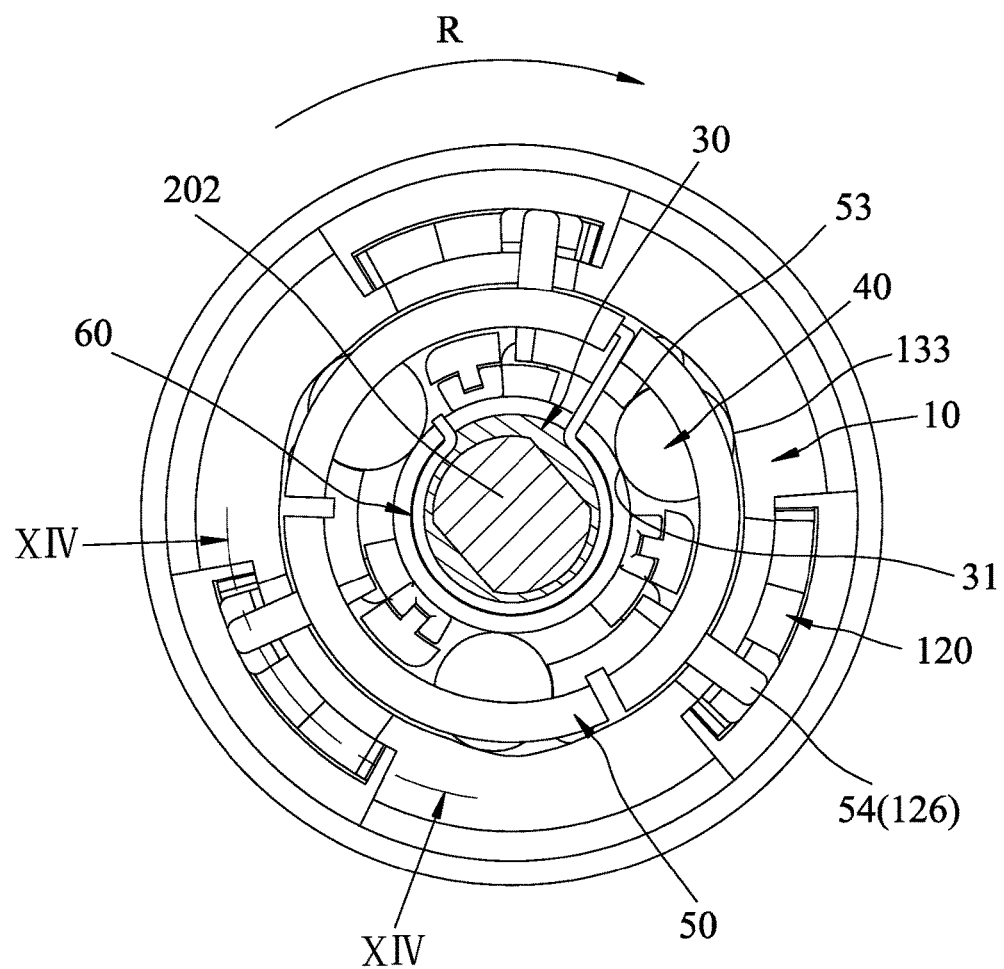
FIG. 13 is a sectional view similar to FIG. 11, illustrating the first drive rollers at reverse rotation involute surfaces of the first drive slots.
Figure 15:
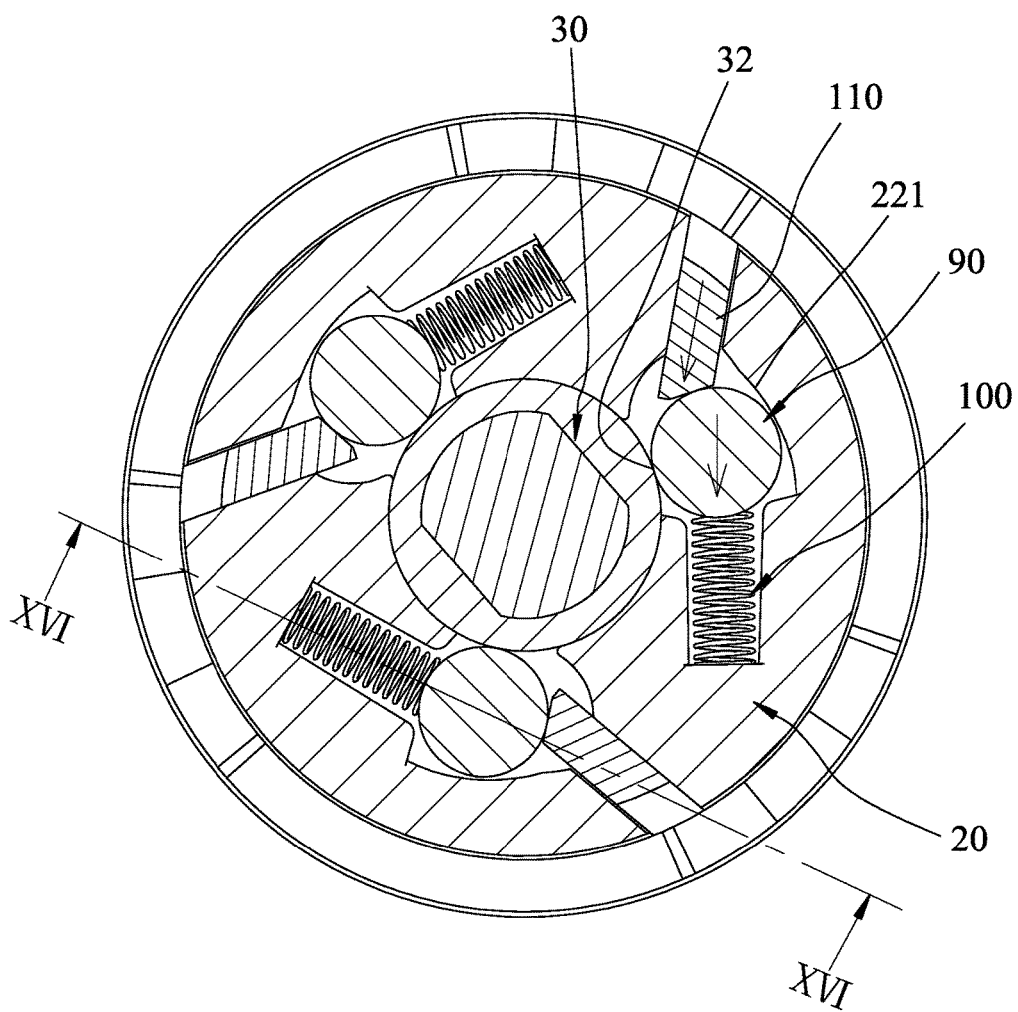
FIG. 15 is a sectional view taken along line XV-XV in FIG. 10, illustrating a state where idle rotation of the inner worm wheel relative to a rotary shaft is enabled.
Figure 16:
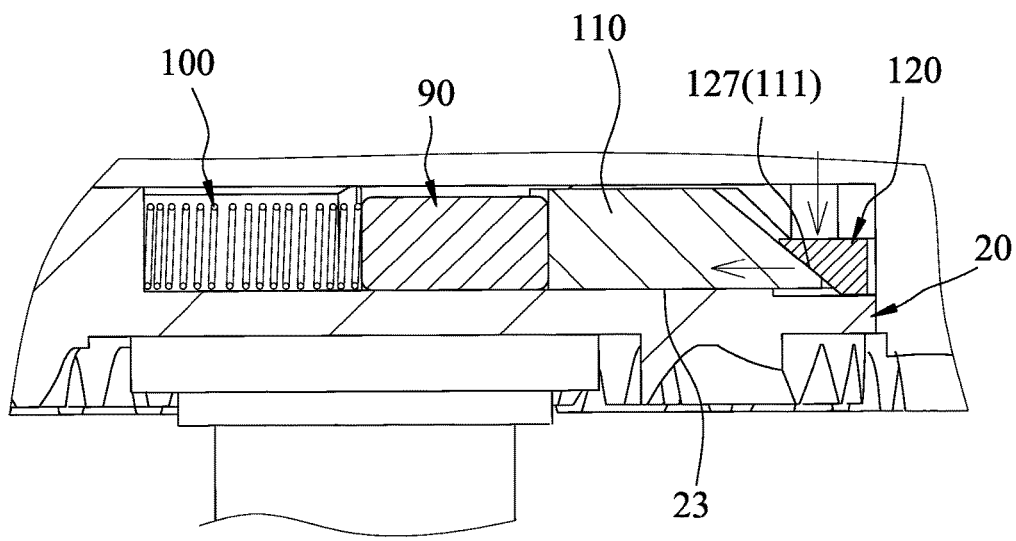
FIG. 16 is a schematic sectional view taken along line XVI-XVI in FIG. 15, illustrating movement of the control sleeve and inward movement of the slide block.

Referring to FIGS. 7, 8 and 9, the positioning pieces 54 of the drive member 50 are shown to be aligned with the level sections 124 of the guide seats 123 of the control sleeve 120. The biasing elements 100 bias the second drive rollers 90 to wedge the second drive rollers 90 between the second driving portion 32 of the drive collar 30 and the involute faces 221 of the second drive slots 22. The second drive rollers 90 push the slide blocks 110 outwardly of the slide slots 23, and the inclined outer faces 111 of the slide blocks 110 push against the taper surface 127 of the control sleeve 120, thereby forcing the control sleeve 120 toward the outer worm wheel 10. Therefore, when the user rotates the handle 201 (see FIG. 2) in the forward rotation direction (F), forward rotation of the rotary shaft 202 is transmitted to the worm shaft 2030 (see FIG. 3) via the inner worm wheel 20 and the worm. 203 for winding the fishing line (not shown) on the spool 4 through rotation of the line guiding rotor 3. Referring to FIG. 13, when the user subsequently rotates the handle 201 (see FIG. 2) in the reverse rotation direction (R), the drive member 50 rotates via the resilient coupling ring 60, and the positioning pieces 54 of the drive member 50 move along the reverse rotation ramp surfaces 126 of the guide seats 123 of the control sleeve 120. The drive member 50 thus moves the control sleeve 120 away from the outer worm wheel 10, and the slide blocks 110 move into the slide slots 23 through cooperation between the taper surface 127 of the control sleeve 120 and the inclined outer surfaces 111 of the slide blocks 110, as best shown in FIGS. 15 and 16. The second drive rollers 90 are released from being wedged between the second driving portion 32 of the drive collar 30 and the involute faces 221 of the second drive slots 22 as a result of pushing by the slide blocks 110, thereby enabling idle rotation of the inner worm wheel 20 relative to the rotary shaft 202 and the drive collar 30. At the same time, the reverse rotation thrust surfaces 53 of the drive member 50 push the first drive rollers 40 to a reverse rotation wedging position, where the first drive rollers 40 are wedged between the first driving portion 31 of the drive collar 30 and the reverse rotation second involute surfaces 133 of the first drive slots 13, thereby enabling transmission of the reverse rotation of the rotary shaft 202 to the worm shaft 2030 via the outer worm wheel 10 and the worm 203.

Referring to FIGS. 2, 3, 4 and 10, when the user rotates the gear ratio adjusting sleeve 140 of the adjusting unit 130 in an opposite direction, the claw parts 170 of the coupling sleeve 150 are moved to another end of the helical tracks 142 farthest from the inner worm wheel 20. Due to sliding engagement between the rotation stopping pieces 722 on the clutch sleeve 70 and the positioning slots 151 on the outer worm wheel 10, the coupling sleeve 150 pulls the clutch sleeve 70 to displace along the axis (L) relative to the rotary shaft 202. At this time, the clutch spring 80 is compressed between the clutch sleeve 70 and the fixing collar 209' and stores a restoring force. As the clutch sleeve 70 moves away from the outer worm wheel 10, the inclined driving faces 721 of the protruding blocks 72 of the clutch sleeve 70 cease to press against the inclined driven surfaces 551 of the extension plates 55 of the drive member 50.

Figure 11:
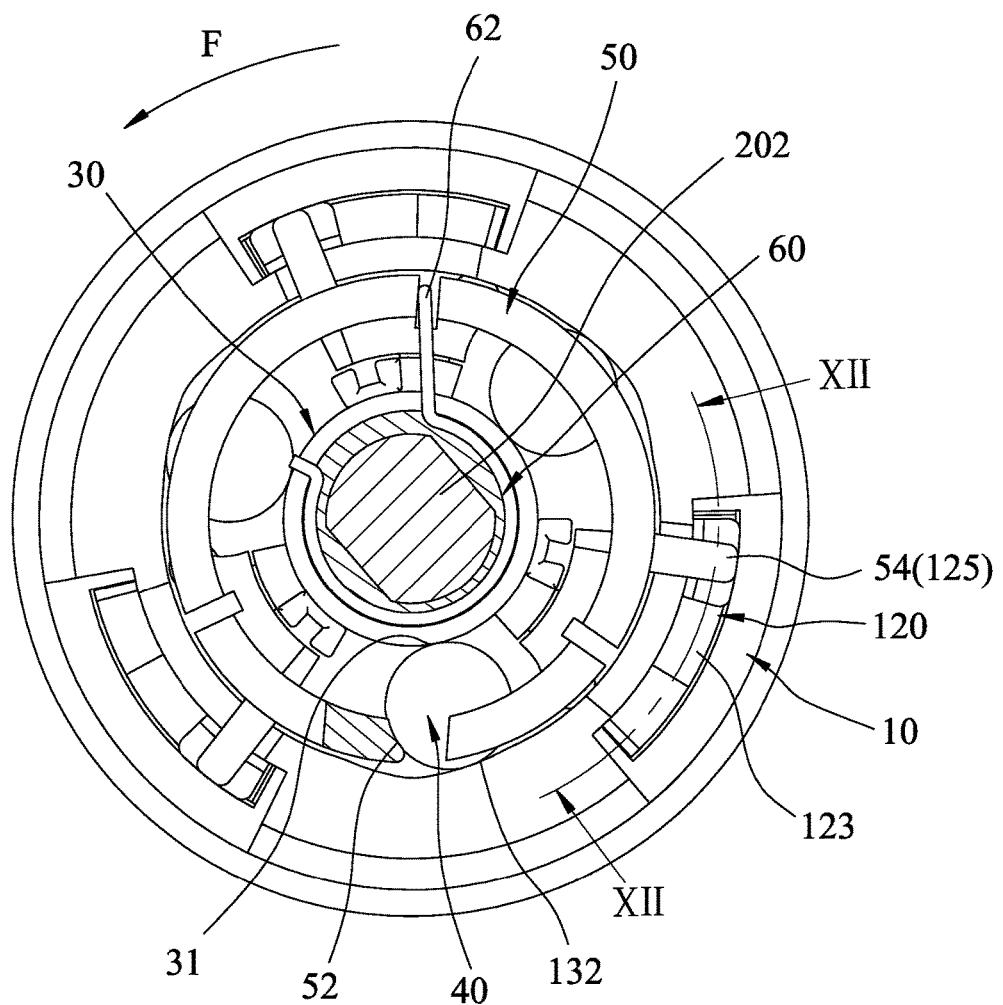
FIG. 11 is a sectional view taken along line XI-XI in FIG. 10, illustrating the first drive rollers at forward rotation involute surfaces of the first drive slots.

Referring to FIGS. 3 and 11, when the user rotates the handle 201 in the forward rotation direction (F), the rotary shaft 202 drives the drive collar 30 to rotate. The drive collar 30 drives the drive member 50 to rotate by virtue of engagement with the hook part 62 of the resilient coupling ring 60. The forward rotation thrust surfaces 52 of the drive member 50 push the first drive rollers 40 to a forward rotation wedging position, where the first drive rollers 40 are wedged between the first driving portion 31 of the drive collar 30 and the forward rotation first involute surfaces 132 of the first drive slots 13, thereby enabling transmission of the forward rotation of the rotary shaft 202 to the worm shaft 2030 via the outer worm wheel 10 and the worm 203 for winding the fishing line (not shown) on the spool 4 through rotation of the line guiding rotor 3.

Figure 12:
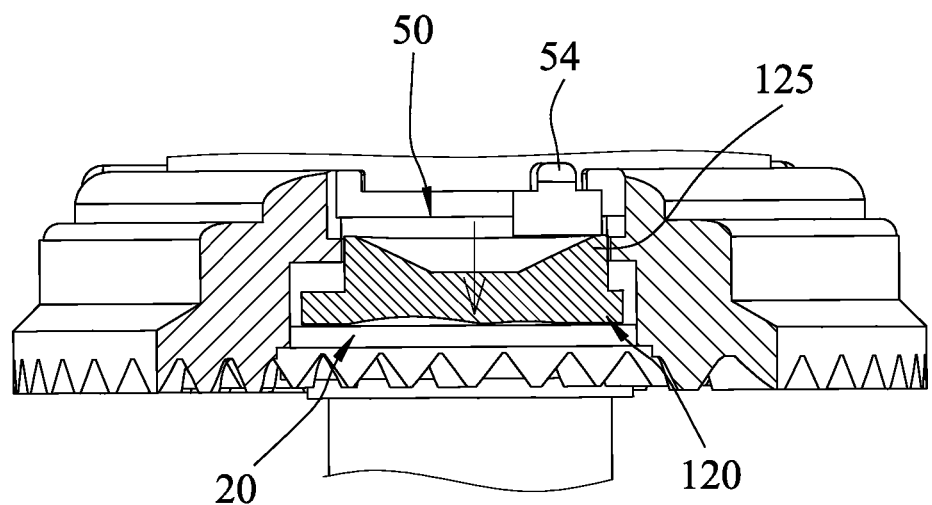
FIG. 12 is a schematic sectional view taken along line XII-XII in FIG. 11, illustrating the positioning piece of the drive member at a forward rotation ramp surface of the guide seat.

Referring to FIGS. 12, 15 and 16, the positioning pieces 54 of the drive member 50 are moved to the forward rotation ramp surfaces 125 of the guide seats 123 of the control sleeve 120 at this time. The drive member 50 thus pushes the control sleeve 120 away from the outer worm wheel 10, and the taper surface 127 of the control sleeve 120 pushes against the inclined outer faces 111 of the slide blocks 110, thereby moving the slide blocks 110 inwardly of the slide slots 23. The slide blocks 110 push the second drive rollers 90 so that the second drive rollers 90 are released from being wedged between the second driving portion 32 of the drive collar 30 and the involute faces 221 of the second drive slots 22. At this time, the biasing elements 100 are compressed, and the inner worm wheel 20 is able to rotate idly relative to the rotary shaft 202 and the drive collar 30.

Referring to FIGS. 3, 10, 13 and 14, when the user rotates the handle 201 in the reverse rotation direction (R), the drive collar 30 drives rotation of the drive member 50 via engagement with the hook part 62 of the resilient coupling ring 60. The reverse rotation thrust surfaces 53 of the drive member 50 push the first drive rollers 40 to the reverse rotation wedging position, where the first drive rollers 40 are wedged between the first driving portion 31 of the drive collar 30 and the reverse rotation second involute surfaces 133 of the first drive slots 13, so that reverse rotation of the rotary shaft 202 is transmitted to the worm shaft 2030 via the outer worm wheel 10 and the worm 203 for reeling out the fishing line (not shown) from the spool 4 through rotation of the line guiding rotor 3.

Figure 14:
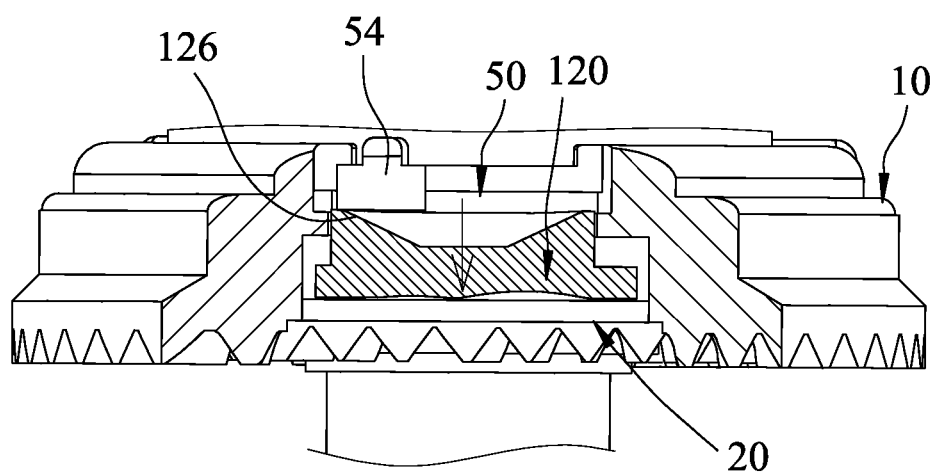
FIG. 14 is a schematic sectional view taken along line XIV-XIV in FIG. 13, illustrating the positioning piece of the drive member at a reverse rotation ramp surface of the guide seat.

Referring to FIGS. 14, 15 and 16, the positioning pieces 54 of the drive member 50 are moved to the reverse rotation ramp surfaces 126 of the guide seats 123 of the control sleeve 120 at this time. The drive member 50 thus pushes the control sleeve 120 away from the outer worm wheel 10, and the taper surface 127 of the control sleeve 120 pushes against the inclined outer faces 111 of the slide blocks 110, thereby moving the slide blocks 110 inwardly of the slide slots 23. The slide blocks 110 push the second drive rollers 90 so that the second drive rollers 90 are released from being wedged between the second driving portion 32 of the drive collar 30 and the involute faces 221 of the second drive slots 22. At this time, the biasing elements 100 are compressed, and the inner worm wheel 20 is able to rotate idly relative to the rotary shaft 202 and the drive collar 30.

Thereafter, when the user operates the gear ratio adjusting sleeve 140 of the adjusting unit 130 in the opposite direction, the fishing reel is restored to the state shown in FIGS. 5 to 9, and forward rotation of the rotary shaft 202 may be transmitted via the inner worm wheel 20, and reverse rotation of the rotary shaft 202 may be transmitted via the outer worm wheel 10.

The adjusting unit 130 thus enables rotation of the rotary shaft 202 to be transmitted to the worm unit via a selected one of the outer worm wheel 10 and the inner worm wheel 20, and enables idle rotation of the other one of the outer worm wheel 10 and the inner worm wheel 20 relative to the rotary shaft 202. By operating the adjusting unit 130, the drive member 50 may dispose the first drive rollers 40 at a selected one of the idling position, the forward rotation wedging position, and the reverse rotation wedging position. The drive member 50 further cooperates with the control sleeve 120 so that idle rotation of the outer worm wheel 10 relative to the rotary shaft 202 is enabled when the second drive rollers 90 are wedged between the second driving portion 32 of the drive collar 30 and the involute faces 221 of the second drive slots 22, and so that idle rotation of the inner worm wheel 20 relative to the rotary shaft 202 is enabled when the first drive rollers 40 are at the forward rotation wedging position or the reverse rotation wedging position.

In this embodiment, by operating the adjusting unit 130 to move the clutch sleeve 70, forward rotation of the rotary shaft 202 may be transmitted to the worm shaft 2030 via the inner worm wheel 20 and the worm 203 for winding of the fishing line (not shown). When the adjusting unit 130 is rotated in the opposite direction, and the user rotates the handle 201, forward rotation of the rotary shaft 202 may be transmitted to the worm shaft 2030 via the outer worm wheel 10 and the worm 203 for winding of the fishing line (not shown). On the other hand, when the user rotates the handle 201 in the opposite direction, reverse rotation of the rotary shaft 202 may be transmitted to the worm shaft 2030 via the outer worm wheel 10 and the worm 203 for reeling out the fishing line (not shown). Accordingly, winding of the fishing line via the line guiding rotor 3 may be accomplished using different gear ratios, and reeling out the fishing line may be accomplished using a higher gear ratio. Such an arrangement may make the spinning reel of the disclosure suitable for a variety of applications.

Figure 17:
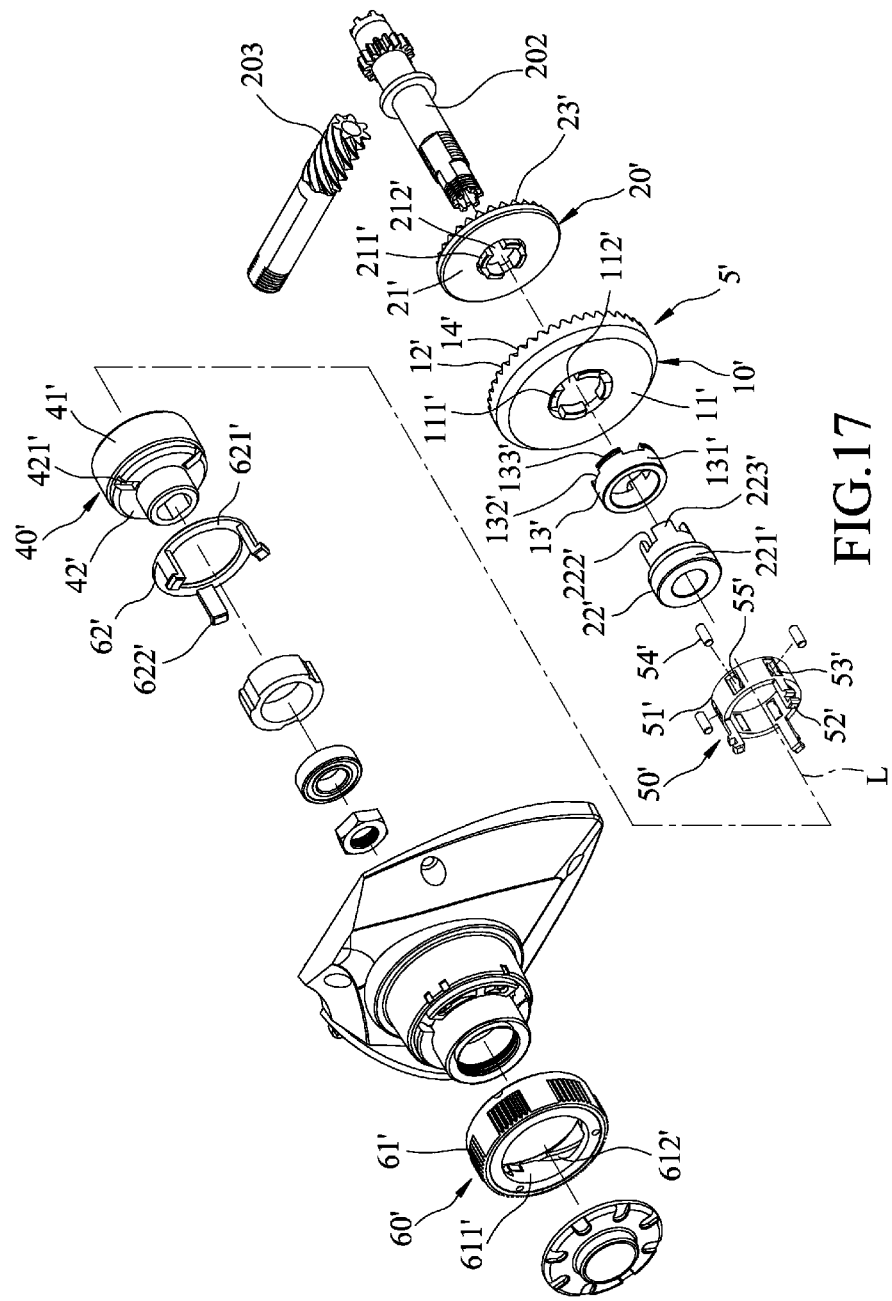
FIG. 17 is an exploded perspective view illustrating a second embodiment of the spinning reel with variable gear ratio transmission according to the disclosure.
Figure 18:
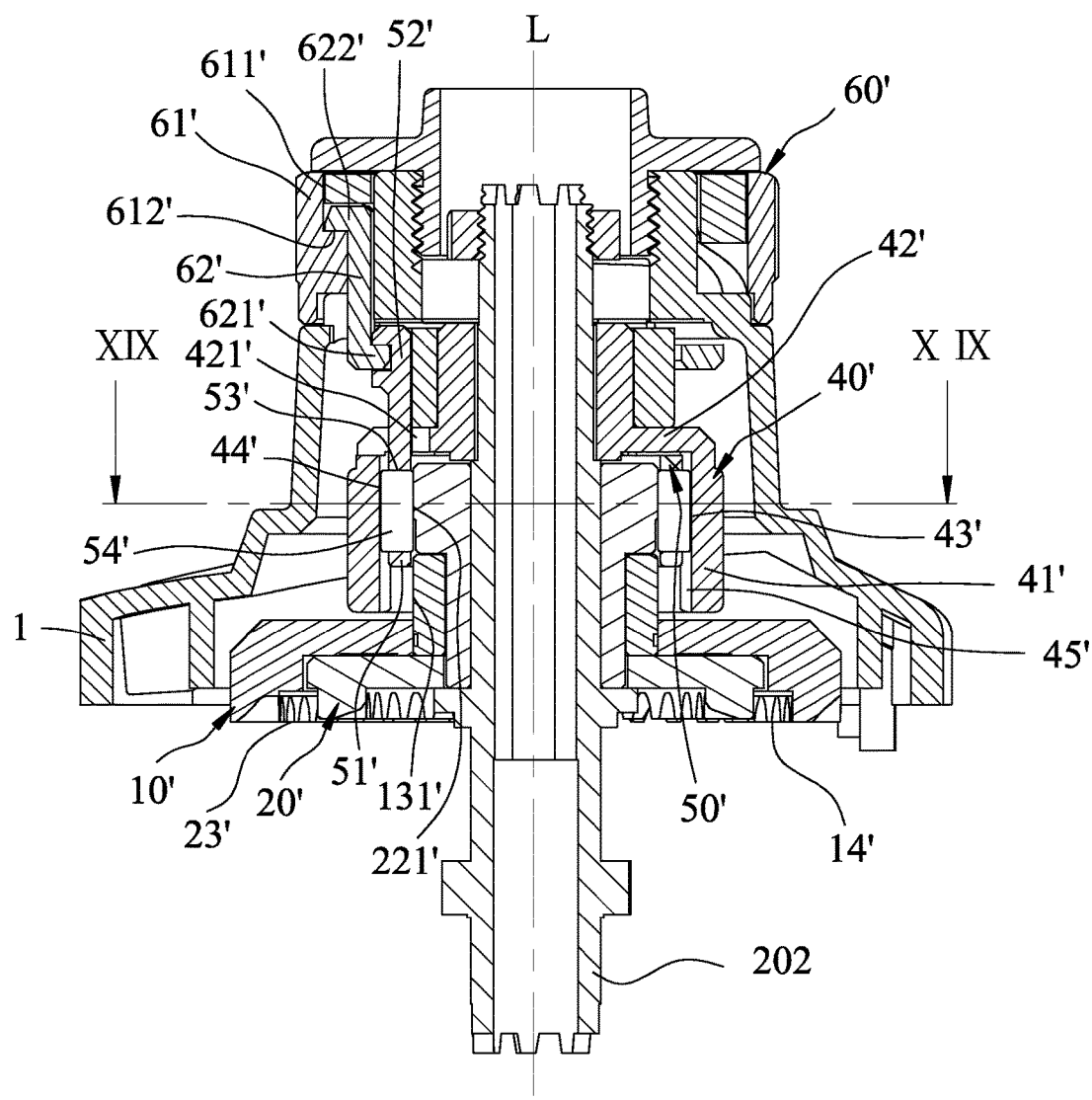
FIG. 18 is an assembled schematic sectional view of the second embodiment, illustrating a clutch sleeve at a second gear ratio position, and an inner worm wheel being drivable for forward rotation transmission and reverse rotation transmission.

Referring to FIGS. 17 and 18, the second embodiment of a spinning reel with variable gear ratio transmission according to the disclosure is shown to differ from the first embodiment in the configuration of the variable gear ratio device 5'.

The variable gear ratio device 5' includes an outer worm wheel 10' and an inner worm wheel 20' rotatably sleeved on the rotary shaft 202, an outer cap member 40' coupled to and co-rotatable with the rotary shaft 202, a clutch sleeve 50' movably disposed in the outer cap member 40', and an adjusting unit 60' for moving the clutch sleeve 50'.

The outer worm wheel 10' has a first end face 11', a back end face 12' opposite to the first end face 11', a first barrel 13' extending from the first end face 11' and coaxial with the axis (L), and a ring of outer gear teeth 14' arranged on the back end face 12' for meshing with the worm 203. The first barrel 13' has a first driving peripheral surface 131'. In practice, the first barrel 13' may be separable from the outer worm wheel 10', the first end face 11' of the outer worm wheel 10' may be formed with a plurality of first insert protrusions 111' that surround the axis (L) and a plurality of first insert grooves 112' each disposed between a corresponding adjacent pair of the first insert protrusions 111', and the first barrel 13' may have a plurality of first engaging grooves 132' for mating engagement with the first insert protrusions 111', and a plurality of first engaging protrusions 133' each disposed between a corresponding adjacent pair of the first engaging grooves 132' and configured for mating engagement with the first insert grooves 112'.

The inner worm wheel 20' has a second end face 21', a second barrel 22' extending from the second end face 21' and coaxial with the axis (L), and a ring of inner gear teeth 23' disposed opposite to the second end face 21' and disposed to mesh with the worm 203. Like the first embodiment, the inner worm wheel 20' is nested in the outer worm wheel 10'. The outer gear teeth 14' surround the inner gear teeth 23', and the outer gear teeth 14' and the inner gear teeth 23' are disposed on a common plane, as best shown in FIG. 18. The outer worm wheel 10' has a first gear ratio with the worm 203, and the inner worm wheel 20' has a second gear ratio with the worm 203. The second gear ratio is smaller than the first gear ratio. The second barrel 22' extends through the first barrel 13' and has a second driving peripheral surface 221' disposed at a distal side of the first driving peripheral surface 131' distal from the first end face 11'. In practice, the second barrel 22' may be formed as a separate component, the second end face 21' of the inner worm wheel 20' may be formed with a plurality of second insert protrusions 211' that surround the axis (L) and a plurality of second insert grooves 212' each disposed between a corresponding adjacent pair of the second insert protrusions 211', and the second barrel 22' may have a plurality of second engaging grooves 222' for mating engagement with the second insert protrusions 211', and a plurality of second engaging protrusions 223' each disposed between a corresponding adjacent pair of the second engaging grooves 222' and configured for mating engagement with the second insert grooves 212'.

Figure 19:
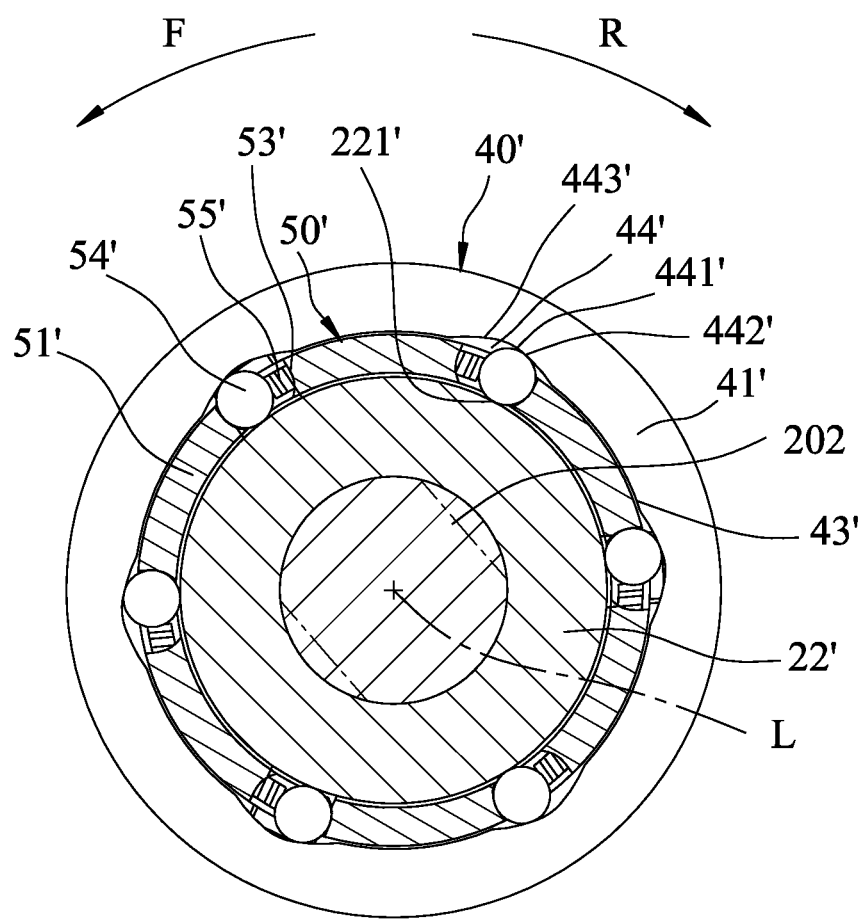
FIG. 19 is a sectional view taken along line XIX-XIX in FIG. 18, illustrating rollers disposed at a second driving peripheral surface.

With further reference to FIG. 19, the outer cap member 40' is disposed at one side of the outer worm wheel 10', is coaxial with the axis (L), and is disposed to surround the first driving peripheral surface 131' and the second driving peripheral surface 221'. The outer cap member 40' has a peripheral wall 41' that surrounds the axis (L), an end wall 42' connected to an edge of the peripheral wall 41', an inner ring surface 43' disposed at the peripheral wall 41', and a plurality of drive slots 44' disposed at the inner ring surface 43', spaced apart from each other and surrounding the axis (L). The peripheral wall 41' and the end wall 42' cooperate to define an inner hole 45'. The end wall 42' is formed with a plurality of openings 421' that are in spatial communication with the inner hole 45'. Each of the drive slots 44' has an intermediate section 441', a forward rotation involute surface 442' that extends from the intermediate section 441' in a reverse rotation direction (R) and in a gradually approaching manner with respect to the axis (L), and a reverse rotation involute surface 443' that extends from the intermediate section 441' in a forward rotation direction (F) opposite to the reverse rotation direction (R) and in a gradually approaching manner with respect to the axis (L).

As best shown in FIG. 19, the clutch sleeve 50' is movably disposed in the outer cap member 40', and has a positioning ring 51' disposed in the inner hole 45' and displaceable along the axis (L), a plurality of hooks 52' connected to the positioning ring 51', a plurality of receiving slots 53' formed through the positioning ring 51' and respectively corresponding in position to the drive slots 44', a plurality of rollers 54' rotatably and respectively disposed in the receiving slots 53', and a plurality of biasing components 55' respectively disposed in the receiving slots 53' and respectively abutting against the rollers 54'. In this embodiment, the biasing components 55' disposed in a portion of the receiving slots 53' bias the respective rollers 54' in a direction that is opposite to the biasing action of the biasing components 55' on the respective rollers 54' in adjacent ones of the receiving slots 53'. The hooks 52' extend through the openings 421' in the end wall 42' of the outer cap member 40', respectively.

The adjusting unit 60' includes a gear ratio adjusting sleeve 61' disposed to surround the rotary shaft 202 and disposed between the handle 201 and the main reel body 1 (see FIG. 2), and a coupling sleeve 62' driven by the gear ratio adjusting sleeve 61'. The gear ratio adjusting sleeve 61' is in the form of a ring, and has an inner annular surface 611' that surrounds the axis (L), and a plurality of helical tracks 612' that are disposed at the inner annular surface 611' and that surround the axis (L). The coupling sleeve 62' has a ring portion 621' for hooking engagement with the hooks 52' to drive movement of the clutch sleeve 50', and a plurality of claw parts 622' that are connected to the ring portion 621' and that are guided by the helical tracks 612'.

Referring to FIGS. 17 to 19, the gear ratio adjusting sleeve 61' is rotated to displace the coupling sleeve 62' along the axis (L) and move the clutch sleeve 50' along the axis (L) away from the outer worm wheel 10' to a second gear ratio position, where the rollers 54' are disposed between the inner ring surface 43' of the outer cap member 40' and the second driving peripheral surface 221' of the second barrel 22'. When the user rotates the handle 201 (see FIG. 2), the rotary shaft 202 and the outer cap member 40' rotate at the same time. At this time, the rollers 54' may be wedged between the second driving peripheral surface 221' and the forward rotation involute surfaces 442' or the reverse rotation involute surfaces 443' of the drive slots 44', thereby enabling forward rotation or reverse rotation of the rotary shaft 202 to be transmitted to the worm 203 via the inner worm wheel 20'. The outer worm wheel 10' rotates idly relative to the rotary shaft 202 at this time.

Figure 20:
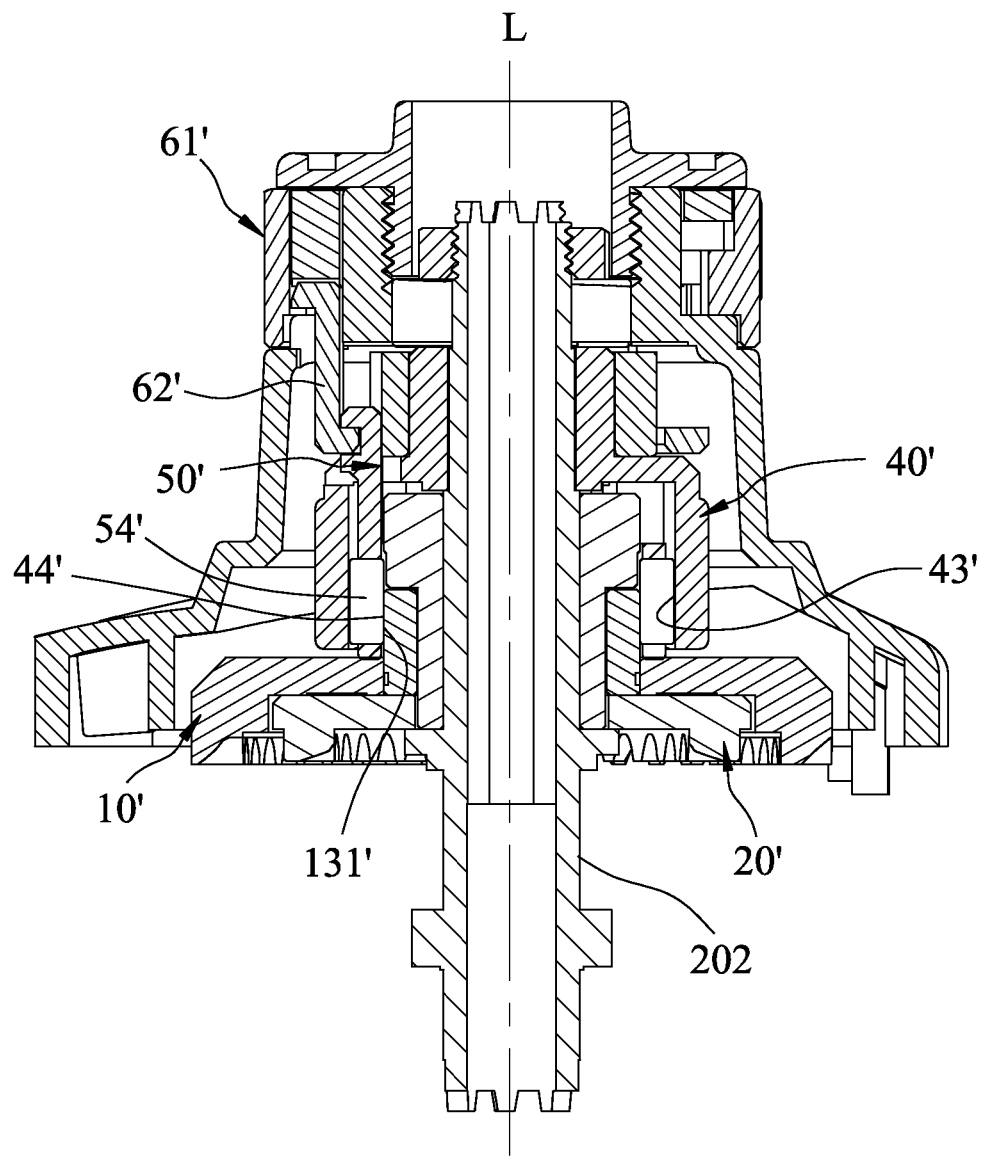
FIG. 20 is another assembled schematic sectional view of the second embodiment, illustrating the clutch sleeve at a first gear ratio position, and an outer worm wheel being drivable for forward rotation transmission and reverse rotation transmission.

Referring to FIGS. 17 and 20, the gear ratio adjusting sleeve 61' is rotated to displace the coupling sleeve 62' along the axis (L) and move the clutch sleeve 50' along the axis (L) toward the outer worm wheel 10' to a first gear ratio position, where the rollers 54' are disposed between the inner ring surface 43' of the outer cap member 40' and the first driving peripheral surface 131' of the first barrel 13'. When the user rotates the handle 201 (see FIG. 2), the rotary shaft 202 and the outer cap member 40' rotate at the same time. At this time, the rollers 54' may be wedged between the first driving peripheral surface 131' and the forward rotation involute surfaces 442' or the reverse rotation involute surfaces 443' of the drive slots 44', thereby enabling forward rotation or reverse rotation of the rotary shaft 202 to be transmitted to the worm 203 via the outer worm wheel 10'. The inner worm wheel 20' rotates idly relative to the rotary shaft 202 at this time.

By virtue of the arrangement in which the biasing components 55' disposed in a portion of the receiving slots 53' bias the respective rollers 54' in a direction that is opposite to the biasing action of the biasing components 55' on the respective rollers 54' in adjacent ones of the receiving slots 53', when the clutch sleeve 50' is driven to rotate, the rollers 54' may engage the forward rotation involute surfaces 442' or the reverse rotation involute surfaces 443' regardless of the direction of rotation to ensure smooth operation.

Therefore, in the second embodiment, winding of the fishing line (not shown) on the spool 4 via the line guiding rotor 3 may be accomplished using different gear ratios, and reeling out the fishing line may be accomplished using different gear ratios.

Figure 21:
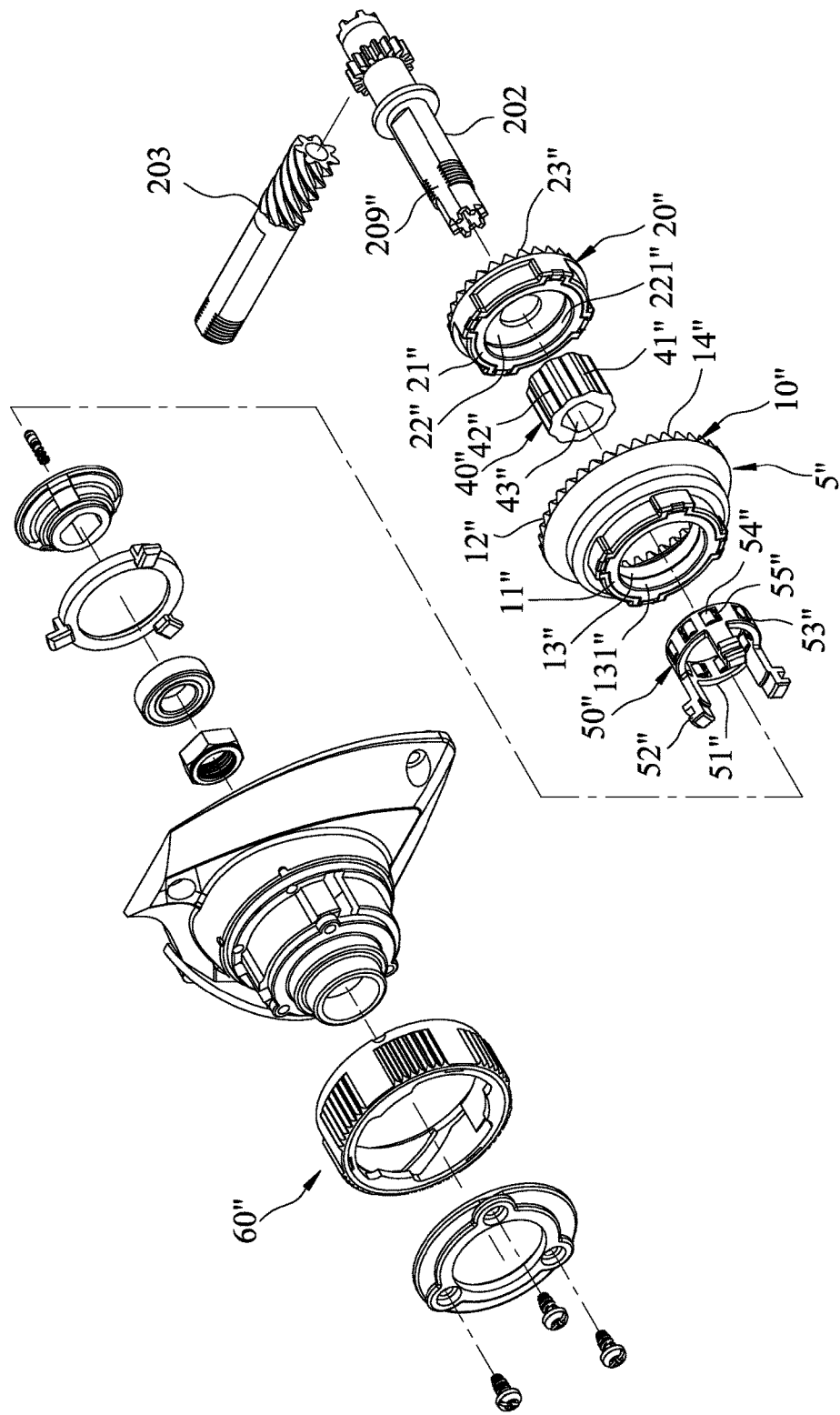
FIG. 21 is a fragmentary exploded perspective view illustrating a third embodiment of the spinning reel with variable gear ratio transmission according to the disclosure.
Figure 22:
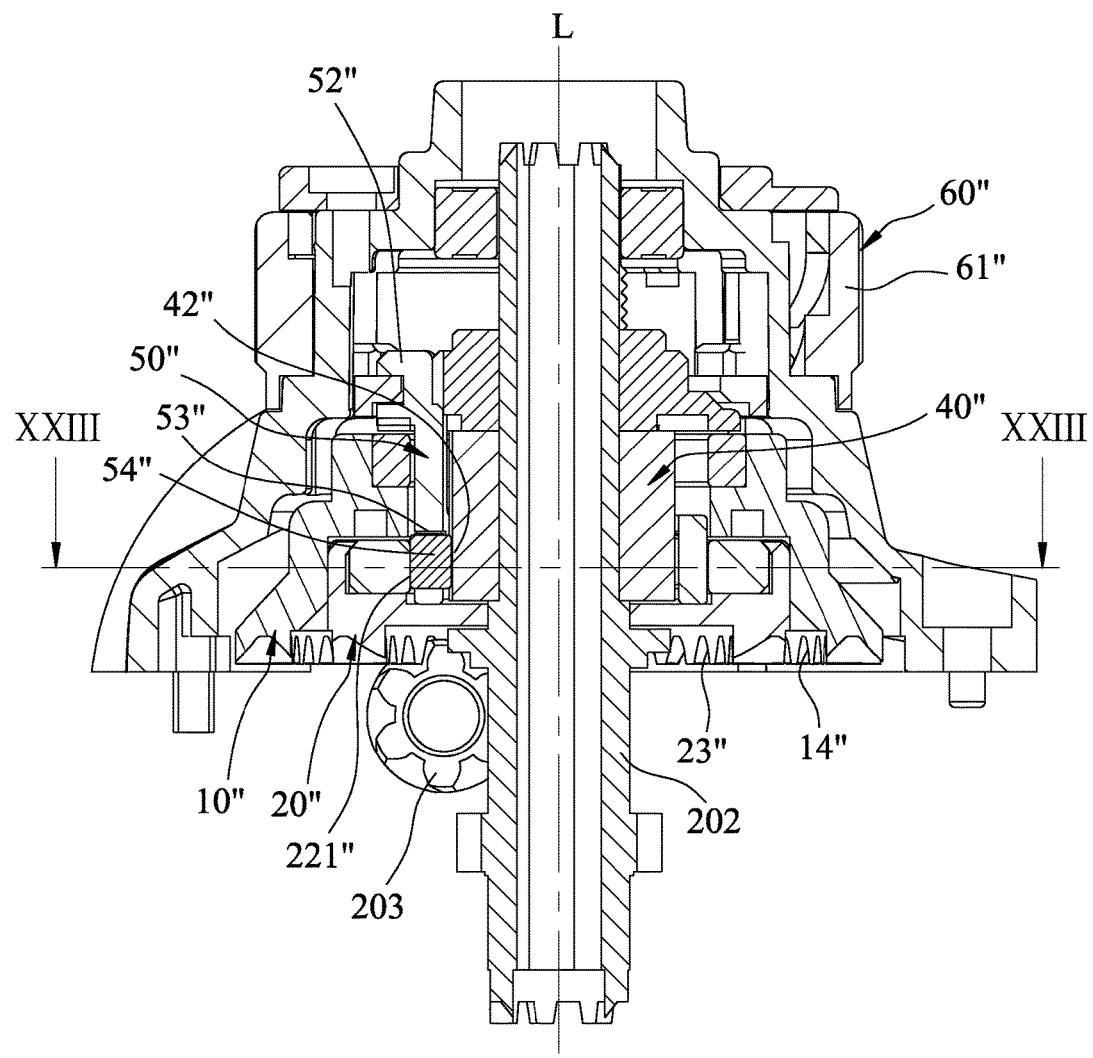
FIG. 22 is an assembled schematic sectional view of the third embodiment, illustrating a clutch sleeve at a second gear ratio position for forward rotation transmission and reverse rotation transmission.
Figure 23:
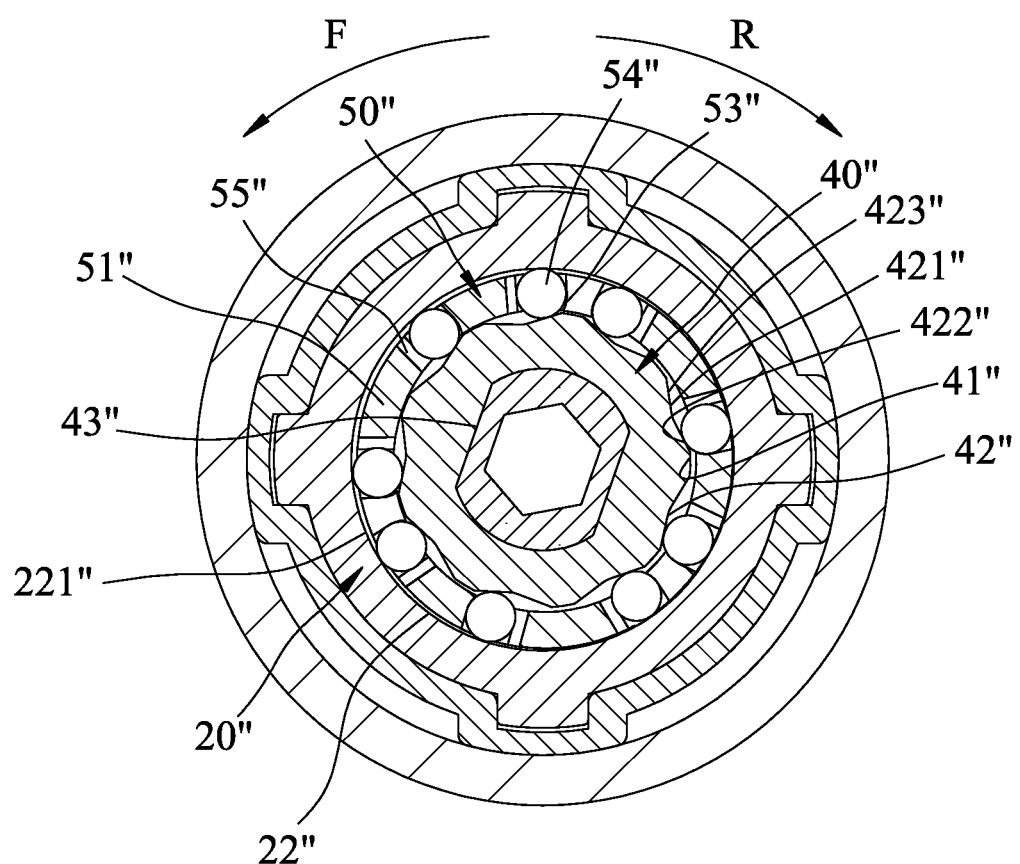
FIG. 23 is a sectional view taken along line XXIII-XXIII in FIG. 22, illustrating rollers at a second driving inner ring surface.

Referring to FIGS. 21, 22 and 23, the third embodiment of a spinning reel with variable gear ratio transmission according to the disclosure is shown to differ from the second embodiment in the configuration of the variable gear ratio device 5".

The variable gear ratio device 5" includes an outer worm wheel 10" and an inner worm wheel 20" rotatably sleeved on the rotary shaft 202, a coupling barrel 40" coupled to and co-rotatable with the rotary shaft 202, a clutch sleeve 50" movably disposed around the coupling barrel 40", and an adjusting unit 60" to drive movement of the clutch sleeve 50".

The outer worm wheel 10" has a first end face 11", a back end face 12" opposite to the first end face 11", a first hole 13" extending from the first end face 11" and extending along the axis (L), and a ring of outer gear teeth 14" arranged on the back end face 12" for meshing with the worm 203. The outer worm wheel 10" further has a first driving inner ring surface 131" that defines the first hole 13" and that surrounds the axis (L).

The inner worm wheel 20" has a second end face 21", a second hole 22" extending from the second end face 21" and extending along the axis (L), and a ring of inner gear teeth 23" disposed opposite to the second end face 21" and disposed to mesh with the worm 203. Like the second embodiment, the inner worm wheel 20" is nested in the outer worm wheel 10". The outer gear teeth 14" surround the inner gear teeth 23", and the outer gear teeth 14" and the inner gear teeth 23" are disposed on a common plane, as best shown in FIG. 22. The outer worm wheel 10" has a first gear ratio with the worm 203, and the inner worm wheel 20" has a second gear ratio with the worm 203. The second gear ratio is smaller than the first gear ratio. The inner worm wheel 20" further has a second driving inner ring surface 221" that defines the second hole 22" and that surrounds the axis (L). The second driving inner ring surface 221" is disposed at one side of the first driving inner ring surface 131" with respect to the axis (L).

The coupling barrel 40" extends into the first hole 13" and the second hole 22" and has an outer barrel surface 41" that confronts the first driving inner ring surface 131" and the second driving inner ring surface 221". The coupling barrel 40" further has a plurality of drive slots 42" disposed at the outer barrel surface 41", spaced apart from each other and surrounding the axis (L). The coupling barrel 40" additionally has a non-circular coupling hole 43" that extends along the axis (L). Each of the drive slots 42" has an intermediate section 421", a forward rotation involute surface 422" that extends from the intermediate section 421" in a reverse rotation direction (R) and in a gradually departing manner with respect to the axis (L), and a reverse rotation involute surface 423" that extends from the intermediate section 421" in a forward rotation direction (F) opposite to the reverse rotation direction (R) and in a gradually departing manner with respect to the axis (L). The coupling hole 43" is for coupling non-rotatably with a portion of the rotary shaft 202 that is provided with the planar parts 209".

The clutch sleeve 50" has a positioning ring 51" extendible into the first hole 13" and the second hole 22" and displaceable along the axis (L), a plurality of hooks 52" connected to the positioning ring 51", a plurality of receiving slots 53" formed through the positioning ring 51" and respectively corresponding in position to the drive slots 42", a plurality of rollers 54" rotatably and respectively disposed in the receiving slots 53", and a plurality of biasing components 55" respectively disposed in the receiving slots 53" and respectively abutting against the rollers 54". In this embodiment, the biasing components 55" disposed in a portion of the receiving slots 53" bias the respective rollers 54" in a direction that is opposite to the biasing action of the biasing components 55" on the respective rollers 54" in adjacent ones of the receiving slots 53". The hooks 52" are driven by the adjusting unit 60".

Referring to FIGS. 22 and 23, when a gear ratio adjusting sleeve 61" of the adjusting unit 60" is rotated, the clutch sleeve 50" is displaced along the axis (L) toward the inner worm wheel 20" to a second gear ratio position, where the rollers 54" are disposed between the outer barrel surface 41" of the coupling barrel 40" and the second driving inner ring surface 221" of the inner worm wheel 20". When the user rotates the handle 201 (see FIG. 2), the rotary shaft 202 and the coupling barrel 40" rotate at the same time. At this time, the rollers 54" may be wedged between the second driving inner ring surface 221" and the forward rotation involute surfaces 422" or the reverse rotation involute surfaces 423" of the drive slots 42", thereby enabling forward rotation or reverse rotation of the rotary shaft 202 to be transmitted to the worm 203 via the inner worm wheel 20". The outer worm wheel 10" rotates idly relative to the rotary shaft 202 at this time.

Figure 24:
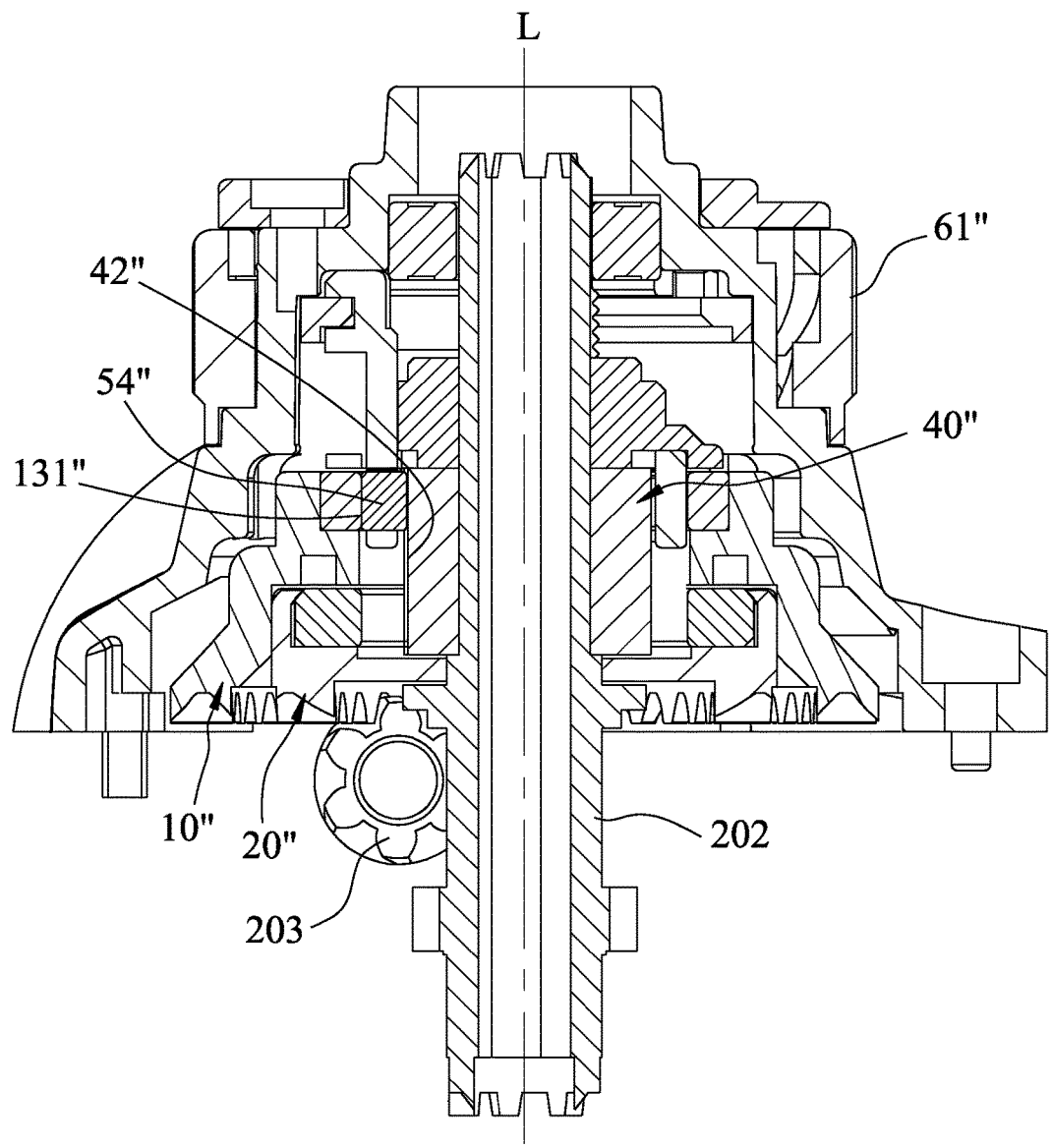
FIG. 24 is another assembled schematic sectional view of the third embodiment, illustrating the clutch sleeve at a first gear ratio position for forward rotation transmission and reverse rotation transmission.

Referring to FIGS. 21, 23 and 24, the gear ratio adjusting sleeve 61" is rotated to move the clutch sleeve 50" along the axis (L) away from the inner worm wheel 20" to a first gear ratio position, where the rollers 54" are disposed between the outer barrel surface 41" of the coupling barrel 40" and the first driving inner ring surface 131" of the outer worm wheel 10". When the user rotates the handle 201 (see FIG. 2), the rotary shaft 202 and the coupling barrel 40" rotate at the same time. At this time, the rollers 54" may be wedged between the first driving inner ring surface 131" and the forward rotation involute surfaces 422" or the reverse rotation involute surfaces 423" of the drive slots 42", thereby enabling forward rotation or reverse rotation of the rotary shaft 202 to be transmitted to the worm 203 via the outer worm wheel 10". The inner worm wheel 20" rotates idly relative to the rotary shaft 202 at this time.

The third embodiment may achieve the same advantages as those of the second embodiment.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A spinning reel with variable gear ratio transmission, comprising:
 a main reel body;
 a handle rotatably disposed at the main reel body;
 a rotary shaft extending along an axis and coupled to and driven by the handle to rotate about the axis;
 a worm unit including a tubular worm shaft that extends along a center line and that is disposed at an angle with respect to the axis, and a worm that is provided on and co-rotatable with the worm shaft;
 a reciprocating mechanism including a reciprocating shaft extending into the worm shaft, the reciprocating mechanism being coupled to and driven by the rotary shaft to result in back and forth movement of the reciprocating shaft with respect to the center line;
 a line guiding rotor coupled to and driven by the worm shaft to rotate about the center line;
 a spool connected to the reciprocating shaft for reciprocating movement with respect to the line guiding rotor; and
 a variable gear ratio device including an outer worm wheel and an inner worm wheel rotatably sleeved on the rotary shaft, the outer worm wheel having a ring of outer gear teeth meshing with the worm, the inner worm wheel being nested in the outer worm wheel and having a ring of inner gear teeth meshing with the worm, the outer gear teeth surrounding the inner gear teeth, the outer gear teeth and the inner gear teeth being disposed on a common plane, the outer worm wheel having a first gear ratio with the worm, the inner worm wheel having a second gear ratio with the worm, the second gear ratio being smaller than the first gear ratio, the variable gear ratio device further including an adjusting unit for enabling rotation of the rotary shaft to be transmitted to the worm unit via a selected one of the outer worm wheel and the inner worm wheel and for enabling idle rotation of the other one of the outer worm wheel and the inner worm wheel relative to the rotary shaft.

2. The spinning reel according to claim 1, wherein:
 the outer worm wheel has a first end face and a plurality of first drive slots indented from the first end face, spaced apart from each other and disposed to surround the axis, each of the first drive slots having an intermediate section, a forward rotation first involute surface that extends from the intermediate section in a forward rotation direction and in a gradually approaching manner with respect to the axis, and a reverse rotation second involute surface that extends from the intermediate section in a reverse rotation direction opposite to the forward rotation direction and in a gradually approaching manner with respect to the axis; and
 the variable gear ratio device further includes a drive collar coupled to and co-rotatable with the rotary shaft, the drive collar extending along the axis through the outer worm wheel and the inner worm wheel and having a first driving portion that corresponds in position to the first drive slots of the outer worm wheel, each of the first drive slots cooperating with the first driving portion to form a corresponding first drive chamber,
 a plurality of first drive rollers respectively and movably installed in the first drive chambers, and
 a drive member disposed adjacent to the first driving portion of the drive collar and rotatable relative to the drive collar and the outer worm wheel to dispose the first drive rollers at a selected one of an idling position, where the drive member disposes the first drive rollers in the intermediate sections of the first drive slots to enable idle rotation of the outer worm wheel relative to the rotary shaft, a forward rotation wedging position, where the drive member wedges the first drive rollers between the first driving portion of the drive collar and the forward rotation first involute surfaces of the first drive slots to enable transmission of forward rotation of the rotary shaft to the worm unit via the outer worm wheel, and a reverse rotation wedging position, where the drive member wedges the first drive rollers between the first driving portion of the drive collar and the reverse rotation second involute surfaces of the first drive slots to enable transmission of reverse rotation of the rotary shaft to the worm unit via the outer worm wheel.

3. The spinning reel according to claim 2, wherein:
 the inner worm wheel has a second end face, a plurality of second drive slots indented from the second end face, and a plurality of slide slots extending outwardly and respectively from the second drive slots, each of the second drive slots having an involute face that corresponds in position to a respective one of the forward rotation first involute surfaces and that extends in the forward rotation direction and in a gradually approaching manner with respect to the axis;
 the drive collar further has a second driving portion that is disposed at one side of the first driving portion along the axis and that corresponds in position to the second drive slots of the inner worm wheel, each of the second drive slots cooperating with the second driving portion to form a corresponding second drive chamber; and
 the variable gear ratio device further includes
 a plurality of second drive rollers respectively and movably installed in the second drive chambers,
 a plurality of biasing elements, each biasing a respective one of the second drive rollers to be wedged between the second driving portion of the drive collar and the involute face of the respective one of the second drive slots so as to enable transmission of forward rotation of the rotary shaft to the worm unit via the inner worm wheel,
- a plurality of slide blocks respectively and slidably disposed in the slide slots and respectively abutting against the second drive rollers, and
- a control sleeve disposed between the outer worm wheel and the inner worm wheel, abutting against the slide blocks and acted upon by the drive member to push the slide blocks and move the second drive rollers against biasing action of the biasing elements from being wedged between the second driving portion of the drive collar and the involute faces of the second drive slots to enable idle rotation of the inner worm wheel relative to the rotary shaft.

4. The spinning reel according to claim 3, wherein idle rotation of the outer worm wheel relative to the rotary shaft is enabled when the second drive rollers are wedged between the second driving portion of the drive collar and the involute faces of the second drive slots, and idle rotation of the inner worm wheel relative to the rotary shaft is enabled when the first drive rollers are at the forward rotation wedging position or the reverse rotation wedging position.

5. The spinning reel according to claim 3, wherein:
the variable gear ratio device further includes a resilient coupling ring connecting the drive collar to the drive member, a clutch sleeve disposed at one side of the drive member, and a clutch spring biasing the clutch sleeve toward the drive member;
the adjusting unit being operable to displace the clutch sleeve along the axis toward or away from the outer worm wheel;
movement of the clutch sleeve toward the outer worm wheel resulting in the clutch sleeve driving the drive member to rotate so as to dispose the first drive rollers at the idling position and so as to enable movement of the control sleeve via the slide blocks for wedging the second drive rollers between the second driving portion of the drive collar and the involute faces of the second drive slots to thereby permit transmission of forward rotation of the rotary shaft to the worm unit via the inner worm wheel;
movement of the clutch sleeve away from the outer worm wheel, followed by forward rotation of the rotary shaft, resulting in rotation of the drive member via the coupling ring so as to dispose the first drive rollers at the forward rotation wedging position to thereby permit transmission of forward rotation of the rotary shaft to the worm unit via the outer worm wheel and so as to move the control sleeve and the slide blocks for releasing the second drive rollers from being wedged between the second driving portion of the drive collar and the involute faces of the second drive slots;
movement of the clutch sleeve away from the outer worm wheel, followed by reverse rotation of the rotary shaft, resulting in rotation of the drive member via the coupling ring so as to dispose the first drive rollers at the reverse rotation wedging position to thereby permit transmission of reverse rotation of the rotary shaft to the worm unit via the outer worm wheel and so as to move the control sleeve and the slide blocks for releasing the second drive rollers from being wedged between the second driving portion of the drive collar and the involute faces of the second drive slots.

6. The spinning reel according to claim 5, wherein:
the outer worm wheel further has a back end face opposite to the first end face and provided with the outer gear teeth, and a plurality of through slots extending from the first end face through the back end face;
the drive member has a plurality of forward rotation thrust surfaces each disposed adjacent to one side of a corresponding one of the first drive rollers, a plurality of reverse rotation thrust surfaces each disposed adjacent to an opposite side of a corresponding one of the first drive rollers, and a plurality of positioning pieces each extending parallel to the axis;
the control sleeve has a first side face and a second side face that are opposite to each other along the axis and that respectively face toward the outer worm wheel and the inner worm wheel, the first side face being formed with a plurality of guide seats that respectively correspond to the positioning pieces and that respectively extend through the through slots of the outer worm wheel, each of the guide seats having a level section, a forward rotation ramp surface that extends circumferentially from one side of the level section, and a reverse rotation ramp surface that extends circumferentially from another side of the level section opposite to the forward rotation ramp surface, the forward rotation ramp surface and the reverse rotation ramp surface of each of the guide seats inclining in opposite directions, the control sleeve further having a taper surface that extends between the first side face and the second side face and that gradually approaches the axis in an extension direction from the second side face toward the first side face;
each of the slide blocks has an inclined outer face that abuts against and complements the taper surface of the control sleeve;
movement of the clutch sleeve toward the outer worm wheel results in alignment of the positioning pieces with the level sections of the guide seats, wedging of the second drive rollers between the second driving portion of the drive collar and the involute faces of the second drive slots via the biasing elements, and outward movement of the slide blocks in the slide slots for pushing the control sleeve toward the outer worm wheel;
subsequent rotation of the drive collar in the reverse rotation direction results in rotation of the drive member via the coupling ring, movement of the positioning pieces along the reverse rotation ramp surfaces of the guide seats, movement of the control sleeve away from the outer worm wheel, inward movement of the slide blocks in the slide slots through cooperation between the taper surface of the control sleeve and the inclined outer surfaces of the slide blocks, release of the second drive rollers from being wedged between the second driving portion of the drive collar and the involute faces of the second drive slots as a result of pushing by the slide blocks, and wedging of the first drive rollers between the first driving portion of the drive collar and the reverse rotation second involute surfaces of the first drive slots as a result of being pushed by the drive collar; and
movement of the clutch sleeve away from the outer worm wheel results in movement of the positioning pieces along the forward rotation ramp surfaces or the reverse rotation ramp surfaces of the guide seats, movement of the control sleeve away from the outer worm wheel, inward movement of the slide blocks in the slide slots through cooperation between the taper surface of the control sleeve and the inclined outer surfaces of the slide blocks, release of the second drive rollers from being wedged between the second driving portion of the drive collar and the involute faces of the second drive slots as a result of pushing by the slide blocks, and wedging of the first drive rollers between the first driving portion of the drive collar and one of the forward rotation first involute surfaces and the reverse rotation second involute surfaces of the first drive slots as a result of being pushed by the drive collar.

7. The spinning reel according to claim 5, wherein the adjusting unit includes:
a gear ratio adjusting sleeve disposed to surround the rotary shaft and disposed between the handle and the main reel body, the gear ratio adjusting sleeve having an inner annular surface that surrounds the axis, and a plurality of helical tracks that are disposed at the inner annular surface and that surround the axis; and
a coupling sleeve having a ring portion coupled to the clutch sleeve, and a plurality of claw parts that are connected to the ring portion and that are guided by the helical tracks;
rotation of the gear ratio adjusting sleeve resulting in displacement of the coupling sleeve along the axis and in corresponding movement of the clutch sleeve along the axis toward or away from the outer worm wheel.

8. The spinning reel according to claim 7, wherein:
the outer worm wheel further has a plurality of positioning blocks each disposed at one side of a respective one of the first drive slots and each extending parallel to the axis;
the drive member further has an inclined driven surface;
the clutch sleeve has an inclined driving face that complements the inclined driven surface of the drive member, and a plurality of rotation stopping pieces that slidably and respectively engage the positioning blocks of the outer worm wheel; and
the clutch spring biases the inclined driving face of the clutch sleeve toward the inclined driven surface of the drive member.

9. The spinning reel according to claim 1, wherein:
the outer worm wheel has a first end face, and a first barrel extending from the first end face and coaxial with the axis, the first barrel having a first driving peripheral surface;
the inner worm wheel has a second end face, and a second barrel extending from the second end face and coaxial with the axis, the second barrel extending through the first barrel and having a second driving peripheral surface disposed at a distal side of the first driving peripheral surface distal from the first end face;
the variable gear ratio device includes
an outer cap member disposed at one side of the outer worm wheel and coaxial with the axis, and disposed to surround the first driving peripheral surface and the second driving peripheral surface, the outer cap member being coupled to and co-rotatable with the rotary shaft and having an inner ring surface and a plurality of drive slots disposed at the inner ring surface, the drive slots being spaced apart from each other and surrounding the axis, each of the drive slots having an intermediate section, a forward rotation involute surface that extends from the intermediate section in a reverse rotation direction and in a gradually approaching manner with respect to the axis, and a reverse rotation involute surface that extends from the intermediate section in a forward rotation direction opposite to the reverse rotation direction and in a gradually approaching manner with respect to the axis,
a clutch sleeve movably disposed in the outer cap member and formed with a plurality of receiving slots that respectively correspond in position to the drive slots, and
a plurality of rollers rotatably and respectively disposed in the receiving slots; and
the adjusting unit is operable to displace the clutch sleeve along the axis between a first gear ratio position, where the rollers are disposed between the inner ring surface of the outer cap member and the first driving peripheral surface, and a second gear ratio position, where the rollers are disposed between the inner ring surface and the second driving peripheral surface.

10. The spinning reel according to claim 9, wherein the adjusting unit includes:
a gear ratio adjusting sleeve disposed to surround the rotary shaft and disposed between the handle and the main reel body, the gear ratio adjusting sleeve having an inner annular surface that surrounds the axis, and a plurality of helical tracks that are disposed at the inner annular surface and that surround the axis; and
a coupling sleeve having a ring portion coupled to the clutch sleeve, and a plurality of claw parts that are connected to the ring portion and that are guided by the helical tracks;
rotation of the gear ratio adjusting sleeve resulting in displacement of the coupling sleeve along the axis and in corresponding movement of the clutch sleeve along the axis between the first gear ratio position and the second gear ratio position.

11. The spinning reel according to claim 10, wherein:
the outer cap member has a peripheral wall that surrounds the axis, and an end wall connected to an edge of the peripheral wall, the peripheral wall and the end wall cooperating to define an inner hole, the peripheral wall having the inner ring surface, the end wall being formed with a plurality of openings that are in spatial communication with the inner hole; and
the clutch sleeve has a positioning ring formed with the receiving slots, and a plurality of hooks connected to the positioning ring, the hooks respectively extending through the openings in the end wall of the outer cap member and engaging the ring portion of the coupling sleeve.

12. The spinning reel according to claim 9, wherein the clutch sleeve further has a plurality of biasing components respectively disposed in the receiving slots and respectively abutting against the rollers, the biasing components disposed in a portion of the receiving slots biasing the respective rollers in a direction that is opposite to biasing action of the biasing components on the respective rollers in adjacent ones of the receiving slots.

13. The spinning reel according to claim 9, wherein:
the first barrel is separable from the outer worm wheel;
the first end face of the outer worm wheel is formed with a plurality of insert protrusions that surround the axis, and a plurality of insert grooves each disposed between a corresponding adjacent pair of the insert protrusions; and
the first barrel has a plurality of engaging grooves for mating engagement with the insert protrusions, and a plurality of engaging protrusions each disposed between a corresponding adjacent pair of the engaging grooves and configured for mating engagement with the insert grooves.

14. The spinning reel according to claim 9, wherein:
the second barrel is separable from the inner worm wheel;
the second end face of the inner worm wheel is formed with a plurality of insert protrusions that surround the axis, and a plurality of insert grooves each disposed between a corresponding adjacent pair of the insert protrusions; and
the second barrel has a plurality of engaging grooves for mating engagement with the insert protrusions, and a plurality of engaging protrusions each disposed between a corresponding adjacent pair of the engaging grooves and configured for mating engagement with the insert grooves.

15. The spinning reel according to claim 1, wherein:
the outer worm wheel has a first end face, a first hole extending from the first end face and extending along the axis, and a first driving inner ring surface that defines the first hole and that surrounds the axis;
the inner worm wheel has a second end face, a second hole extending from the second end face and extending along the axis, and a second driving inner ring surface that defines the second hole and that surrounds the axis, the second driving inner ring surface being disposed at one side of the first driving inner ring surface with respect to the axis;
the variable gear ratio device includes
a coupling barrel coupled to and co-rotatable with the rotary shaft, the coupling barrel extending into the first hole and the second hole and having an outer barrel surface that confronts the first driving inner ring surface and the second driving inner ring surface, the coupling barrel further having a plurality of drive slots disposed at the outer barrel surface, spaced apart from each other and surrounding the axis, each of the drive slots having an intermediate section, a forward rotation involute surface that extends from the intermediate section in a reverse rotation direction and in a gradually departing manner with respect to the axis, and a reverse rotation involute surface that extends from the intermediate section in a forward rotation direction opposite to the reverse rotation direction and in a gradually departing manner with respect to the axis, and
a clutch sleeve movably disposed around the coupling barrel and extendible into the first hole and the second hole, the clutch sleeve being formed with a plurality of receiving slots that respectively correspond in position to the drive slots and having a plurality of rollers rotatably and respectively disposed in the receiving slots; and
the adjusting unit is operable to displace the clutch sleeve along the axis between a first gear ratio position, where the rollers are disposed between the outer barrel surface of the coupling barrel and the first driving inner ring surface, and a second gear ratio position, where the rollers are disposed between the outer barrel surface and the second driving inner ring surface.

16. The spinning reel according to claim 15, wherein the clutch sleeve further has a plurality of biasing components respectively disposed in the receiving slots and respectively abutting against the rollers, the biasing components disposed in a portion of the receiving slots biasing the respective rollers in a direction that is opposite to biasing action of the biasing components on the respective rollers in adjacent ones of the receiving slots.

* * * * *